(12) United States Patent
Kuhn et al.

(10) Patent No.: US 8,682,345 B2
(45) Date of Patent: Mar. 25, 2014

(54) UTILIZING RELATIONSHIPS BETWEEN PLACES OF RELEVANCE

(71) Applicants: Lukas Daniel Kuhn, San Diego, CA (US); Jinwon Lee, San Diego, CA (US); Vidya Narayanan, San Diego, CA (US)

(72) Inventors: Lukas Daniel Kuhn, San Diego, CA (US); Jinwon Lee, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/629,202

(22) Filed: Sep. 27, 2012

(65) Prior Publication Data

US 2013/0079031 A1 Mar. 28, 2013

Related U.S. Application Data

(60) Provisional application No. 61/540,512, filed on Sep. 28, 2011, provisional application No. 61/540,509, filed on Sep. 28, 2011.

(51) Int. Cl.
H04W 88/02 (2009.01)

(52) U.S. Cl.
USPC ...................................... 455/456.1

(58) Field of Classification Search
USPC ...................... 455/456.1, 501, 452.2; 370/312
See application file for complete search history.

(56) References Cited

U.S. PATENT DOCUMENTS

| | | | |
|---|---|---|---|
| 6,429,809 B1 | 8/2002 | Vayanos et al. | |
| 6,718,278 B1 | 4/2004 | Steggles | |
| 7,079,950 B2 | 7/2006 | Sakata et al. | |
| 7,756,534 B2 | 7/2010 | Anupam et al. | |
| 2004/0259575 A1 | 12/2004 | Perez-Breva et al. | |
| 2008/0133126 A1 | 6/2008 | Dupray | |
| 2008/0146250 A1 | 6/2008 | Aaron | |
| 2008/0152235 A1* | 6/2008 | Bashyam et al. | 382/224 |
| 2011/0018732 A1 | 1/2011 | Cho et al. | |
| 2011/0070863 A1 | 3/2011 | Ma et al. | |
| 2011/0182238 A1 | 7/2011 | Marshall et al. | |
| 2011/0269452 A1 | 11/2011 | Roumeliotis et al. | |
| 2012/0040653 A1 | 2/2012 | Mendis | |
| 2012/0066035 A1 | 3/2012 | Stanger et al. | |
| 2012/0112958 A1 | 5/2012 | Alizadeh-Shabdiz et al. | |
| 2012/0178482 A1* | 7/2012 | Seo et al. | 455/501 |
| 2012/0191512 A1 | 7/2012 | Wuoti et al. | |
| 2013/0170423 A1* | 7/2013 | Abe et al. | 370/312 |

FOREIGN PATENT DOCUMENTS

WO 2011019125 A1 2/2011

OTHER PUBLICATIONS

Hightower, et al., "Learning and Recognizing the Places We Go," in Proceedings of the Seventh International Conference on Ubiquitous Computing (Ubicomp 2005), Sep. 2005, pp. 159-176.
Kang, et al., "Extracting Places from Traces of Locations," SIGMOBILE Mobile Computing Communications Review, Jul. 2005, pp. 58-68, vol. 9, No. 3.

(Continued)

*Primary Examiner* — Diane Mizrahi
(74) *Attorney, Agent, or Firm* — Kilpatrick Townsend and Stockton LLP

(57) ABSTRACT

Methods, systems, computer-readable media, and apparatuses for utilizing relationships between places of relevance are presented. In some embodiments, a mobile computing device may obtain information indicative of a micro-place of relevance visited by the mobile device at a first time. The information may be based on measurements taken by the mobile device at the first time. Further, the mobile device may derive an attribute of the visit to the micro-place of relevance based on the obtained information and a place model that associates micro-places of relevance with macro-places of relevance.

40 Claims, 12 Drawing Sheets

(56) References Cited

OTHER PUBLICATIONS

Kim et al., "SenLoc: Sensing Everyday Places and Paths using Less Energy," in 8th ACM Conference on Embedded Networked Sensor Systems (SenSys 2010), Nov. 3-5, 2010.

International Search Report and Written Opinion—PCT/US2012/058035—ISA/EPO—Feb. 5, 2013.
Correa, et al., "Room-Level Wi-Fi Location Tracking," Carnegie Mellon Silicon Valley, Draft, pp. 1-12, Nov. 2008.

* cited by examiner

UTILIZING RELATIONSHIPS BETWEEN PLACES OF RELEVANCE

CROSS-REFERENCE TO RELATED APPLICATIONS

This application claims the benefit of U.S. Provisional Patent Application Ser. No. 61/540,512, filed Sep. 28, 2011, and entitled "Macro And Micro Places Of Relevance Extraction—Integrating Macro And Micro Places For Inferring One Without The Other;" and U.S. Provisional Patent Application Ser. No. 61/540,509, filed Sep. 28, 2011, and entitled "Automatic Recognition Of Visited Sections Of A Large Indoor Or Outdoor Space." Each of the foregoing applications is incorporated by reference herein in its entirety for all purposes.

BACKGROUND

Aspects of the disclosure relate to computing technologies, such as computer hardware and/or computer software. In particular, aspects of the disclosure relate to mobile computing device technologies, systems, methods, apparatuses, and computer-readable media.

Increasingly, mobile devices, such as smart phones, tablet computers, and other mobile computing devices, include location-based functionalities which allow such devices to provide appropriate content and other features based on the location of such a device (and correspondingly, the location of the user of the device). For example, a mobile device may be able to determine its current location (e.g., using positioning signals received from navigation satellites) and, based on its determined location, display advertisements for nearby stores and provide other location-specific information to a user.

In some instances, however, a mobile device might not be able to determine its current location, for instance, because of poor reception of positioning signals, lack of appropriate hardware, or other reasons (e.g., low power, reduced processing resources, power conservation mode, etc.). In these instances, location-based functionalities might be rendered inoperable and/or otherwise unavailable, as such a mobile device may be unable to determine its position.

BRIEF SUMMARY

Certain embodiments are described that provide more efficient and convenient ways of obtaining an understanding of a mobile device's location.

In some embodiments, information that describes the relationships between different places, including information about hierarchical relationships between larger places and smaller places, may be used in evaluating various signal measurements and other observables that may be indicative of the device's position. In particular, in accordance with various aspects of the disclosure, information about places of relevance, along with information about various relationships between such places of relevance, may be used in deriving and/or otherwise determining additional information about a mobile device's visit to a particular place.

As used herein, a place of relevance or "PoR" may refer to an area or other location that a mobile device (and correspondingly, a user of such a device) visits at least a certain number of times and/or in which the device remains for a long enough amount of time to be considered significant. In addition, and as discussed in greater detail below, a "macro-PoR" may refer to a place of relevance that can be identified using location services that rely on one or more Satellite Positioning System (SPS) signals (e.g., GPS signals, GLONASS signals, etc.), one or more cellular signals, and/or one or more WiFi signals. A "micro-PoR" may refer to a place of relevance that can be identified based on WiFi scans, but might not be identifiable using other location services.

In some embodiments, information indicative of a micro-PoR visited by a mobile device at a first time may be obtained. The information may be based on measurements from the mobile device at the first time. Subsequently, an attribute of the visit may be derived based on the information and a place model associating micro-PoRs with macro-PoRs. In at least one embodiment, the information may be obtained, and the attribute may be derived, by the mobile device.

In some arrangements, in addition to obtaining information indicative of the micro-PoR visited by the mobile device, the mobile device also may obtain information indicative of a first macro-PoR visited by the mobile device during the first time. The information indicative of the first macro-PoR may, for instance, be based on measurements from the mobile device at the first time. Subsequently, the first macro-PoR may be corrected using the derived attribute. In some arrangements, the derived attribute may include a length of time spent at the first macro-PoR. In other arrangements, the derived attribute may include a second macro-PoR, and the second macro-PoR may be associated with the micro-PoR in the place model. In these arrangements, prior to correcting the first macro-PoR using the derived attribute, it may be determined that a confidence level that is determined with respect to the association of the micro-PoR with the second macro-PoR in the place model is above a threshold.

In one or more arrangements, a mobile device may obtain a macro-PoR visited by the mobile device during the first time. In these arrangements, the derived attribute may include a length of time spent at the micro-PoR, and the length of time may be derived based on the macro-PoR.

In one or more additional and/or alternative arrangements, the derived attribute may include a macro-PoR, and the macro-PoR may be associated with the micro-PoR in the place model. In these arrangements, the mobile device may merge the visit with a second visit to the macro-PoR.

In still one or more additional and/or alternative arrangements, the micro-PoR might not be associated with a macro-PoR in the place model, and the derived attribute may include a first macro PoR visited by the mobile device during the first time. In addition, in these arrangements, deriving the attribute of the visit may include determining that the micro-PoR is located in the same macro-PoR as a second micro-PoR, based on information in the place model that associates the second micro-PoR with the first macro-PoR.

In some embodiments, a method for detecting an error in a determination of a place of relevance visit can be performed (e.g., by one or more computing devices) and/or otherwise provided. The method may, for instance, include determining a macro-PoR visit and a micro-PoR visit for an end user to a location. Subsequently, an association between a macro-PoR and a micro-PoR may be derived for the location based on the results of the determination of the macro-PoR visit and the micro-PoR visit. Then, an error in the determination of the PoR visit may be inferred by at least using the association between the macro-PoR and the micro-PoR for the location.

In some arrangements, the method can further include correcting the error by at least using the association between the macro-PoR visit and the micro-PoR visit for the location if the error in the determination of the PoR visit is inferred. In some additional and/or alternative arrangements, the macro-PoR may be derived using one or more location services, such as GPS, cellular, and/or WiFi data services. In one or more additional and/or alternative arrangements, the micro-PoR may be derived from one or more WiFi scans of a surrounding area. In still one or more additional and/or alternative arrangements, the association between the macro-PoR and the micro-PoR may be based on the association between the micro-PoR and another micro-PoR that is also associated with the macro-PoR.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof While particular embodiments, in which one or more aspects of the disclosure may be implemented, are described below, other embodiments may be used and various modifications may be made without departing from the scope of the disclosure or the spirit of the appended claims.

Certain embodiments are described that enable a mobile device to utilize relationships between micro places of relevance and macro places of relevance, particularly in instances in which the mobile device may derive information about a micro place visit in order to create and/or modify information about a corresponding macro place visit.

In some embodiments, a mobile device may be able to provide location aware features and/or functionalities based only on a rough idea of where the device and/or the user of the device are located (e.g., at work or at home) or without knowledge of an absolute location and/or a location on a map, without requiring more precise information about the current position of the device, such as latitude and longitude coordinates specifying a location of the device. In addition, by leveraging this understanding of the mobile device's location, a mobile device may be able to provide location aware functionalities to a user with better power efficiency than if such a precise position of the device were obtained.

In several of the examples discussed below, this understanding of a mobile device's position may be determined based on wireless signals, such as wireless LAN signals, that are observed and/or otherwise received by the mobile device. Using the various unique combinations of wireless signals that a mobile device can observe in different places, the mobile device can be configured to recognize certain micro places of relevance and provide location aware features accordingly. In addition, and as described in greater detail below, the mobile device can also be configured to derive additional information about visits to different micro places of relevance based on place model information, which may define the relationships between various micro places of relevance and various macro places of relevance. And, using this derived information, for instance, the mobile device may be able to provide additional and/or enhanced location aware features and/or functionalities.

Various embodiments will now be discussed in greater detail with reference to the accompanying figures, beginning with FIG. 1.

Figure 1:
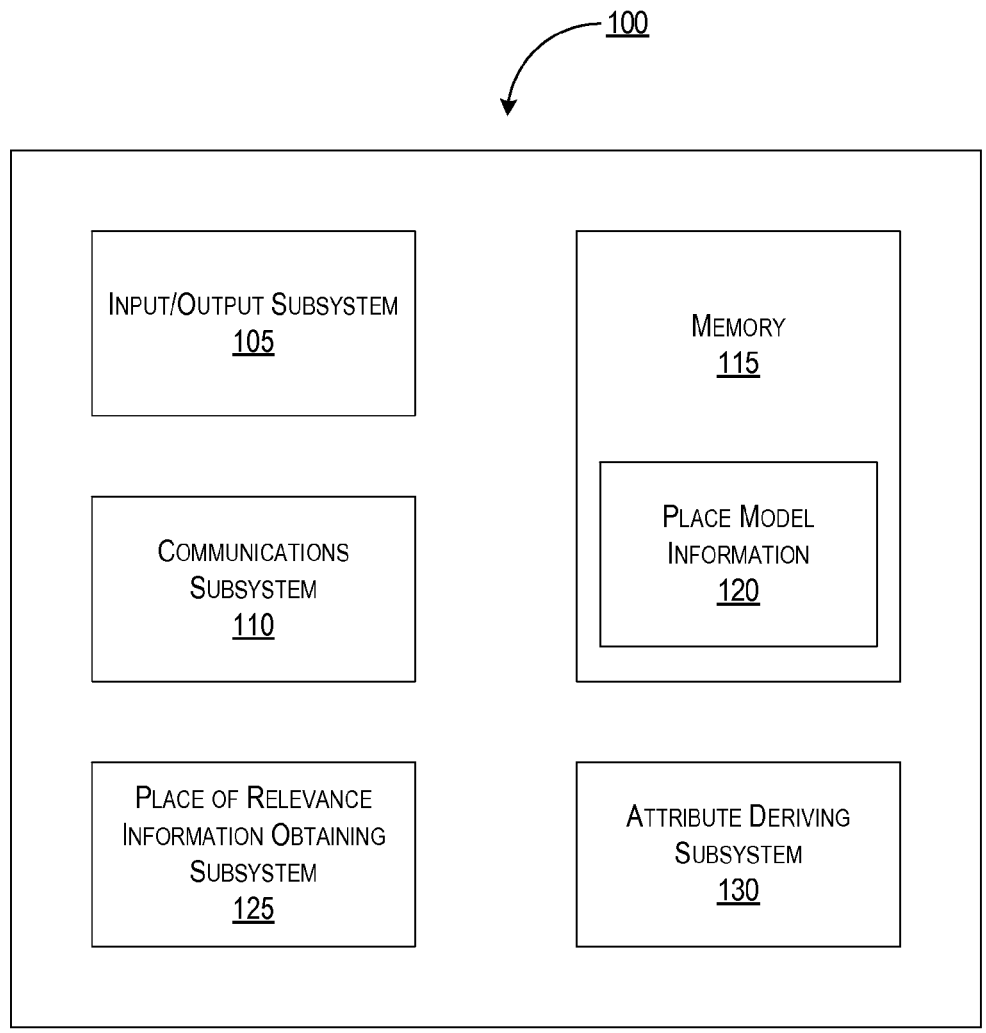
FIG. 1 illustrates a simplified diagram of a system that may incorporate one or more embodiments.

FIG. 1 illustrates a simplified diagram of a system 100 that may incorporate one or more embodiments. In the embodiment illustrated in FIG. 1, system 100 can include multiple subsystems, including an input/output subsystem 105, a communication subsystem 110, a place of relevance information obtaining subsystem 125, and an attribute deriving subsystem 130, as well as a memory 115. One or more communication paths may be provided that enable memory 115 and/or the various subsystems to communicate with and exchange data with one another. In addition, the various subsystems illustrated in FIG. 1 may be implemented in software, in hardware, or in combinations thereof In some embodiments, system 100 may be incorporated into a mobile device. In some embodiments, system 100 may be incorporated into a server or other device in communication with a mobile device.

In various embodiments, system 100 may include other subsystems than those shown in FIG. 1. Additionally, the embodiment shown in FIG. 1 is only one example of a system that may incorporate some embodiments, and in other embodiments, system 100 may have more or fewer subsystems than those illustrated in FIG. 1, may combine two or more subsystems, or may have a different configuration or arrangement of subsystems.

In some embodiments, input/output subsystem 105 may provide one or more interfaces that enable input to be received from, and/or output to be provided to, a user of system 100. For instance, input/output subsystem 105 may include one or more input devices, such as one or more buttons or keys, a mouse, a cursor, a trackball, a touchscreen, a microphone, one or more ports (e.g., a serial port), and/or other input devices. Additionally, input/output subsystem 105 may include one or more output devices, such as one or more display screens, one or more audio speakers, and/or other output devices.

In some embodiments, communications subsystem 110 may enable system 100 to communicate electronically with one or more other devices. Communications subsystem 110 may include one or more wired and/or wireless interfaces via which system 100 may send and/or receive information. Examples of wired interfaces that may be included in communications subsystem 110 include one or more Ethernet interfaces, one or more serial port interfaces, and/or other wired communications interfaces. Examples of wireless interfaces that may be included in communications subsystem 110 include one or more cellular communications interfaces (e.g., one or more CDMA interfaces, WCDMA interfaces, GSM interfaces, etc.), one or more wireless LAN (WLAN) interfaces (e.g., one or more IEEE 802.11 interfaces), and/or other wireless communications interfaces (e.g., Bluetooth, ZigBee, etc.).

In some embodiments, memory 115 may store various types of information that can be used by the various components and/or subsystems of system 100. In addition, memory 115 may allow such components and/or subsystems to access and/or modify the information stored in memory 115.

In one or more arrangements, memory 115 may store place model information 120 in which information that defines and/or is otherwise related to one or more place models may be stored. Such a place model may, for instance, define particular relationships between one or more macro places of relevance and one or more micro places of relevance. For example, a place model for a particular macro place of relevance may specify that one or more particular micro places of relevance are included in the macro place of relevance. In addition, a place model may include information about two or more macro places of relevance, as well as information about any number of micro places of relevance that may be included in each of the macro places of relevance. In some embodiments, the place model may comprise any association of one or more micro places of relevance with one or more macro places of relevance.

In addition, a place model may, in some embodiments, be stored and/or otherwise represented in one or more tables and/or as one or more other data structures. For example, a place model may include information about a number of different access points (e.g., wireless LAN access points) that have been observed at a number of different places of relevance, and such information may have been collected by one or more mobile devices via one or more WiFi scans in various visits to the various places of relevance. In addition, for each access point for which the place model includes information, the place model may include a Basic Service Set Identification (BSSID) for the access point, an average Received Signal Strength Indication (RSSI) for the access point, and/or a Response Rate (RR) for the access point. Additionally, while a single place model may be used by a mobile device and/or another device in providing a number of the functionalities discussed below, in some embodiments, such a device may use several place models in providing the functionalities discussed herein. For example, each place model may be associated with a different portion of a location (e.g., one place model may include stores while another place model includes public areas such as hallways, different place models may be associated with each different floor of a building, or the place models may otherwise be associated with different portions of the location), or overlapping place models may include differing information (e.g., one place model may include information indicating RSSI while another place model includes RR, different place models may be associated with data collected from different users or at different time periods, or the place models may otherwise be associated with differing information). Other embodiments wherein a plurality of place models are determined, analyzed, utilized, and/or maintained may also be implemented.

In some arrangements, a place model may further include information that can be used to identify a particular macro place of relevance and/or a particular micro place of relevance. For example, and as described in greater detail below, a macro place of relevance and/or a micro place of relevance may be identified using information about the wireless signals that can be observed in the particular macro place of relevance and/or micro place of relevance. Additionally, a place model may, for instance, include wireless signal fingerprint information that describes the signals that are observable at various places of relevance associated with the place model.

In some embodiments, place of relevance obtaining subsystem 125 may enable system 100 to obtain information about a micro place of relevance that has been and/or is currently being visited by the system and/or a user thereof. The information about the micro place of relevance may include signal observations and/or other measurements, which may have some temporal relevance, such that these signals observations and/or other measurements are associated with a particular visit to a particular place at a particular time. In addition, place of relevance obtaining subsystem 125 may, in some arrangements, be configured to cause system 100 to perform a scan of wireless signals that are observable at its position, and subsequently acquire data about such signals from such a scan. Additionally or alternatively, place of relevance obtaining subsystem 125 may simply be configured to obtain information about a scan of wireless signals (e.g., performed by the system or by another device, such as another mobile device).

In some arrangements, such a wireless signal scan may be performed by communications subsystem 110, and may include gathering measurements and/or other information about signals that are detectable and/or otherwise receivable by system 100. For example, the information that may be measured and/or otherwise gathered in a wireless signal scan may include, for each wireless signal that is detected and/or otherwise received, a signal identifier, signal strength information (e.g., a Received Signal Strength Indication (RSSI) measurement, other signal power measurement, etc.), a round trip time (RTT) measurement, a round trip delay (RTD) measurement, a time of arrival (TOA) measurement, an angle of arrival (AOA) measurement, and/or other measurements.

In some embodiments, attribute deriving subsystem 130 may enable system 100 to derive and/or otherwise determine information about a visit to a particular place, for instance, based on information obtained by place of relevance information obtaining subsystem 125 and/or based on placed model information. For example, attribute deriving subsystem 130 may analyze signal measurements obtained by place of relevance obtaining subsystem 125 in view of place model information 120 in order to identify one or more micro places of relevance that may have been visited by system 100, as well as one or more corresponding macro places of relevance that may have been visited by system 100 (e.g., at the time or times when such micro places of relevance were visited).

Figure 2:
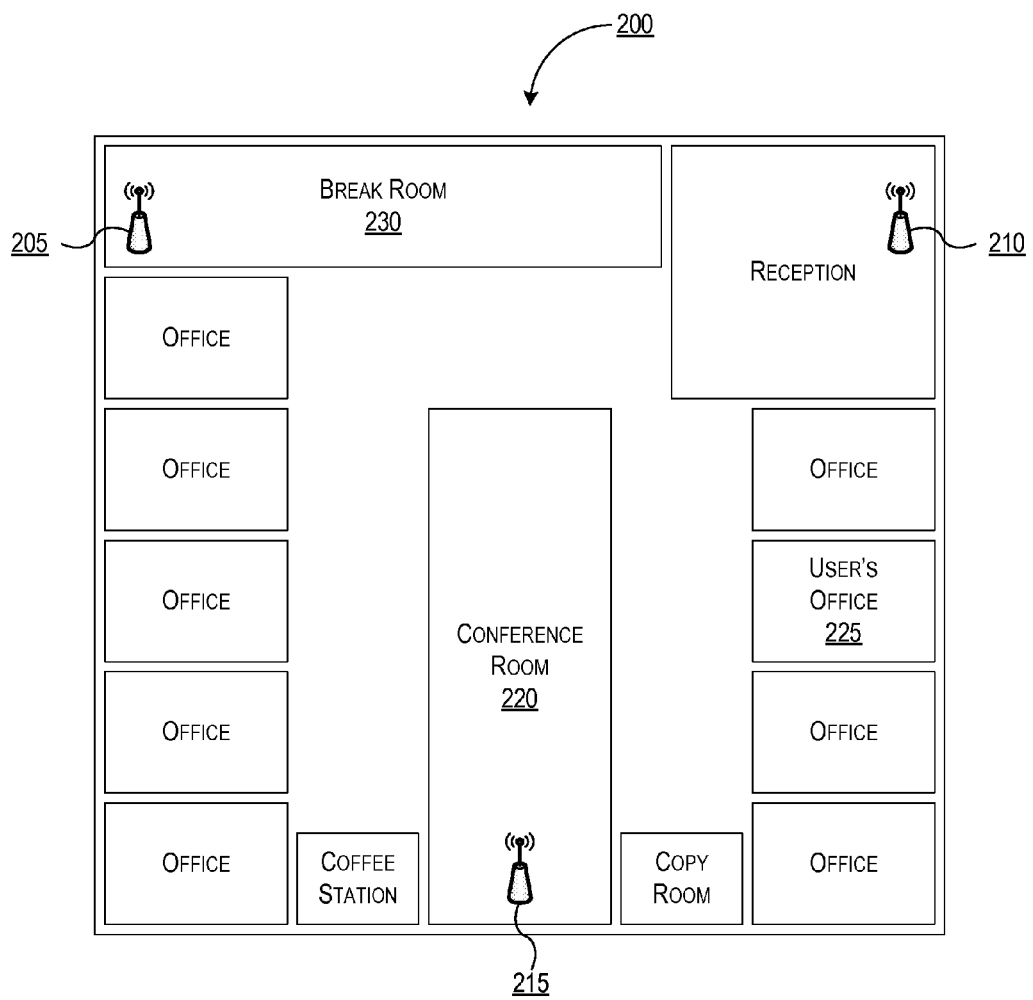
FIG. 2 illustrates an example of a macro place of relevance that includes a number of micro places of relevance in accordance with one or more illustrative aspects of the disclosure.

FIG. 2 illustrates an example of a macro place of relevance that includes a number of micro places of relevance in accordance with one or more illustrative aspects of the disclosure. As noted above, a macro place of relevance can be a space that includes a number of sub-spaces, for example discrete and/or separable sub-spaces, and one or more of these sub-spaces may form one or more micro-places of relevance that are included in and/or are otherwise associated with the macro place of relevance. For example, a macro place of relevance may be an office building, and a micro place of relevance that is associated with that macro place of relevance may be a particular office or conference room within the office building. As another example, a macro place of relevance may be a shopping mall, and a micro place of relevance that is associated with that macro place of relevance may be a particular store or other area within the shopping mall. As still another example, a macro place of relevance may be a college campus, and a micro place of relevance may be a particular building or other space (e.g., a courtyard) that is part of the college campus.

In some embodiments, a macro place of relevance can be a place of relevance that is identifiable by position coordinates (e.g., latitude and longitude) which can be obtained from a location service, such as a Global Positioning System (GPS) positioning service executed on and/or otherwise provided by a mobile device. For example, a macro place of relevance may be a place of relevance that can be identified using location services that rely on one or more Satellite Positioning System (SPS) signals (e.g., GPS signals, GLONASS signals, etc.), one or more cellular signals, and/or one or more WiFi signals (e.g., WLAN signals, such as IEEE 802.11 wireless signals).

On the other hand, a micro place of relevance may be any place of relevance that is smaller or that may be at least partially included within or otherwise associated with a macro place of relevance. For example, a micro place of relevance might not be distinguishable using position coordinates (e.g., latitude and longitude) or other measures of similar accuracy provided by one or more location services on a mobile device (e.g., a mobile communications device, such as a smart phone or tablet computer). Thus, while traditional positioning techniques may enable a device to locate a macro place of relevance in some embodiments, such techniques might not be able to identify an associated micro place of relevance in certain embodiments. For example, a micro place of relevance may be a place of relevance that can be identified based on one or more WiFi scans (e.g., to obtain a WiFi signature or radio frequency (RF) fingerprint of wireless signals that are present and/or receivable at the particular location), but might not be identifiable or distinguishable using other location services. In some embodiments, a micro place of relevance may be associated with an observed basic service set identification (BSSID) or medium access control (MAC) address of a wireless access point (WAP).

By recognizing macro places of relevance and micro places of relevance, a mobile device may be able to provide various types of location aware content and/or location aware functionalities. For example, using information about a macro place of relevance and/or a micro place of relevance that is currently being visited or has been previously visited by the user of a mobile device, the mobile device may be able to perform certain actions, execute certain functions, or modify particular settings. For instance, this information may be used in real-time to automatically execute a certain program or script based on the macro place of relevance and/or micro place of relevance that is currently being visited. In addition, and as discussed in greater detail below, utilizing information about visits to particular micro places of relevance may enable a device to obtain a better understanding of, and potentially correct errors in, information related to visits to macro places of relevance. This may enable a device to collect, aggregate, analyze, refine, and/or otherwise obtain information that describes a history of places visited by the device, which can then be used for any desired purpose (e.g., pattern matching and analysis, targeted advertising, etc.). In some instances, information about micro places of relevance and/or macro places of relevance visited by a mobile device also may enable the mobile device to not only provide functions that are based on location (e.g., including functions that are based purely on the position of the mobile device), but also provide contextually aware applications and/or services (e.g., by determining, based on the place of relevance information, a situation or context in which the user of the mobile device may be).

In the example illustrated in FIG. 2, macro place of relevance 200 is the ground floor of an office building, and it includes a number of discrete sub-spaces, including a reception area, several offices, a conference room, and a break room, among other things, as well as several wireless access points (e.g., access point 205, access point 210, and access point 215). Each of the sub-spaces may individually be a micro place of relevance that is associated with macro place of relevance 200, and/or one or more sub-spaces may collectively form one or more micro places of relevance that are associated with macro place of relevance 200. In some embodiments, the macro place of relevance 200 may comprise the entire office building or multiple floors of the office building, and the micro places of relevance may be distributed across the different floors.

In some embodiments, a device visiting macro place of relevance 200 may determine that a particular WiFi signature or RF fingerprint is associated with a particular micro place of relevance that is included in macro place of relevance 200, for example using the subsystems 110, 125, and/or 130. For example, based on signal information stored by the mobile device, the device may determine whether the particular WiFi signature or RF fingerprint has been previously encountered, and accordingly, whether a micro place of relevance corresponding to the WiFi signature or RF fingerprint has been previously visited. If, for instance, the micro place of relevance has been previously visited, then information about the micro place of relevance may already be stored in a place model for macro place of relevance 200, for example in the place model information 120. Such information may, for instance, indicate a label or name previously assigned to the micro place of relevance, for example based on input from the user of the device via the subsystem 105. On the other hand, if no information exists about the WiFi signature or RF fingerprint (and, correspondingly, the micro place of relevance), then the mobile device may prompt the user to provide more information about the micro place of relevance that is currently being visited. For example, the mobile device may prompt the user to enter a name or label for the micro place of relevance. In some instances, the mobile device may obtain a label for the micro place of relevance by other means. For example, the mobile device may obtain a label for a micro place of relevance based on information included in a user's calendar, based on indoor map information, based on crowd-sourced labels for various places of relevance, and/or from one or more other sources.

Notably, having knowledge that the mobile device and/or the user thereof are visiting (or have visited) a particular micro place of relevance within macro place of relevance 200 may enable certain location-aware features that are operable without a more accurate position determination (e.g., a coordinates-based position fix). Rather, certain location-aware features may be able to provide location-based functionalities using a rougher understanding of the device's position (e.g., as provided by a micro-place of relevance determination), as discussed in the examples below.

For example, a mobile device can, in some embodiments, be configured to change one or more behaviors based on the device visiting a particular place of relevance. For instance, a user of a mobile device may configure his or her device to automatically disable ringer sounds and enter a silent/vibrate mode when the user takes the device into conference room 220. To provide this functionality, the mobile device may, for instance, be configured to recognize conference room 220 as a micro place of relevance, based, for instance, on a particular WiFi signature or RF fingerprint that is present and/or detectable when the device is in conference room 220. For example, when the user takes the mobile device into conference room 220, the device may determine that a new micro place of relevance is being visited and may prompt the user to enter a label for the new micro place of relevance. Additionally or alternatively, the user may provide input to the mobile device indicating that the device is in a new micro place of relevance, and the device may prompt the user accordingly.

Once the user provides a name or label for the micro place of relevance associated with conference room 220, the mobile device may generate and/or store information describing the WiFi signature and/or RF fingerprint that is detectable in the micro place of relevance, along with the name or label and/or other information associated with the micro place of relevance. Such information may, for instance, form all or part of a place model for the micro place of relevance associated with conference room 220 and macro place of relevance 200. In addition, such a WiFi signature and/or RF fingerprint may, for instance, include information describing the signal strengths and/or other signal properties of wireless signals received from any number of wireless transmitters, including access point 205, access point 210, and access point 215.

Thereafter, when the user visits conference room 220 in future instances, the mobile device may be able to determine that the micro place of relevance associated with conference room 220 is being visited (e.g., based on the particular WiFi signature and/or RF fingerprint that is present and/or detectable when the device is in conference room 220). In addition, based on determining that the micro place of relevance is being visited, the mobile device may automatically disable ringer sounds and enter a silent/vibrate mode in accordance with its configuration.

In other examples, detection and recognition of micro places of relevance may be used to provide other functionalities. For instance, similar to how the mobile device may be configured to automatically disable ringer sounds and enter a silent/vibrate mode when the user takes the device into conference room 220, the device also may be configured to enable a Bluetooth link to a user's desktop computer when the device detects that it is in a micro place of relevance associated with the user's office 225. As another example, the mobile device may be configured to post a particular status message (e.g., an "Away" message) to an instant messaging service and/or a social networking service when the device determines that it is in a micro place of relevance associated with break room 230.

In still other examples, detection and recognition of macro places of relevance may be used to provide various functionalities. For example, similar to how a mobile device may be configured to automatically disable ringer sounds and enter a silent/vibrate mode when the user takes the device into conference room 220, the device also may be configured to forward incoming calls to the user's desk phone when the user is anywhere within the office building 200. In some embodiments, a personal mobile device of a user may be configured to forward calls to voicemail when it is determined that the mobile device is located at a particular macro place of relevance, for example the user's work, except when the mobile device is located within one or more micro places of relevance within that macro place, for example the user's office.

In certain examples discussed above (e.g., in which a mobile device can perform different functions based on the detection and recognition of various micro places of relevance and/or macro places of relevance), the particular geographic location of the mobile device and/or the user thereof (e.g., as may be described using GPS data, longitude and latitude coordinates, etc.) might have little, if any, significance in providing the various functions discussed in these examples, for instance. Rather, the visitation itself of a particular micro place of relevance and/or a particular macro place of relevance may be more significant, regardless of its geographic coordinates or map position, and a mobile device might ignore or turn off other location services (e.g., GPS services, other coordinates-based position services, etc.) accordingly. Indeed, in some instances, the mobile device and/or the user thereof may disable certain position services (e.g., GPS services, other coordinates-based position services, etc.) when a certain macro place of relevance and/or micro place of relevance, such as the user's workplace or home, is detected and/or otherwise recognized. This may not only be used to increase privacy for the user in certain situations (for example, the user may not wish to show a location when at home), but may reduce battery consumption, use of processing resources, and/or network traffic, for example when it is determined that the mobile device is located in a micro or macro place of relevance known, e.g., to have poor GPS reception. Further, one or more embodiments described above, for example, may allow a mobile device to identify a macro place using only a micro place identification in some embodiments, thereby enabling the device to forgo using other location services. As an example, a mobile device may be configured to determine a macro place of relevance being visited based on a WiFi scan of an environment in some embodiments without enabling SPS services.

While the examples discussed above and illustrated in FIG. 2, describe an example situation in which a macro place of relevance is the size of an office building and corresponding micro places of relevance are sub-spaces in the office building, the sizes and/or scale of various places of relevance may be different in other arrangements. For instance, in one example, a macro place of relevance may be an office campus that includes a number of buildings (e.g., three, four, five, etc.), and each building may be a micro place of relevance. Furthermore, while each building may be a micro place of relevance in one place model, in this example, one or more other place models also may be defined for the same physical space and used by the mobile device. In one or more of these other place models, each building (e.g., each building that is a micro place of relevance in the first place model) may be a macro place of relevance in another place model that, in turn, may include a number of micro places of relevance. These micro places of relevance may, for example, be defined with respect to the macro place of relevance associated with the particular building of the office campus.

In addition, in some embodiments, places of relevance and/or entire place models may be defined separately for different users of one or more mobile devices. For example, places of relevance may be defined separately for each user of one or more mobile devices based on an amount of time spent in each place, based on one or more labels that may be defined and/or otherwise provided for various places (e.g., including user-defined labels), and/or based on one or more functions that may be defined for various places (e.g., including user-customizable location-aware functionalities). Thus, places of relevance, including micro places of relevance and macro places of relevance, might not be universal, but instead may vary. In some instances, however, at least some places of relevance, including micro places of relevance and/or macro places of relevance, may be shared across different users (e.g., different users of the same device, different users of different devices, etc.). For example, some places of relevance and/or entire place models may be shared across users when places of relevance information is crowd-sourced from a number of users (e.g., where a number of users and/or a number of devices provide places of relevance information to one or more central servers for sharing with other users and/or other devices). In addition, a place of relevance may be different and/or separate from a known place of interest in some instances, but in some embodiments, a place of relevance also may be the same as a known place of interest.

Having discussed several examples illustrating how detection and recognition of micro places of relevance and macro places of relevance may be used by a mobile device to provide various functionalities, several examples that illustrate how relationships between places of relevance may be utilized by such a mobile device will now be discussed in greater detail with respect to FIGS. 3-9. In any and/or all of these examples, the mobile device being discussed can incorporate and/or embody system 100 and/or any part thereof.

FIGS. 3-9 illustrate various examples of utilizing relationships between places of relevance according to one or more illustrative aspects of the disclosure.

Figure 3:
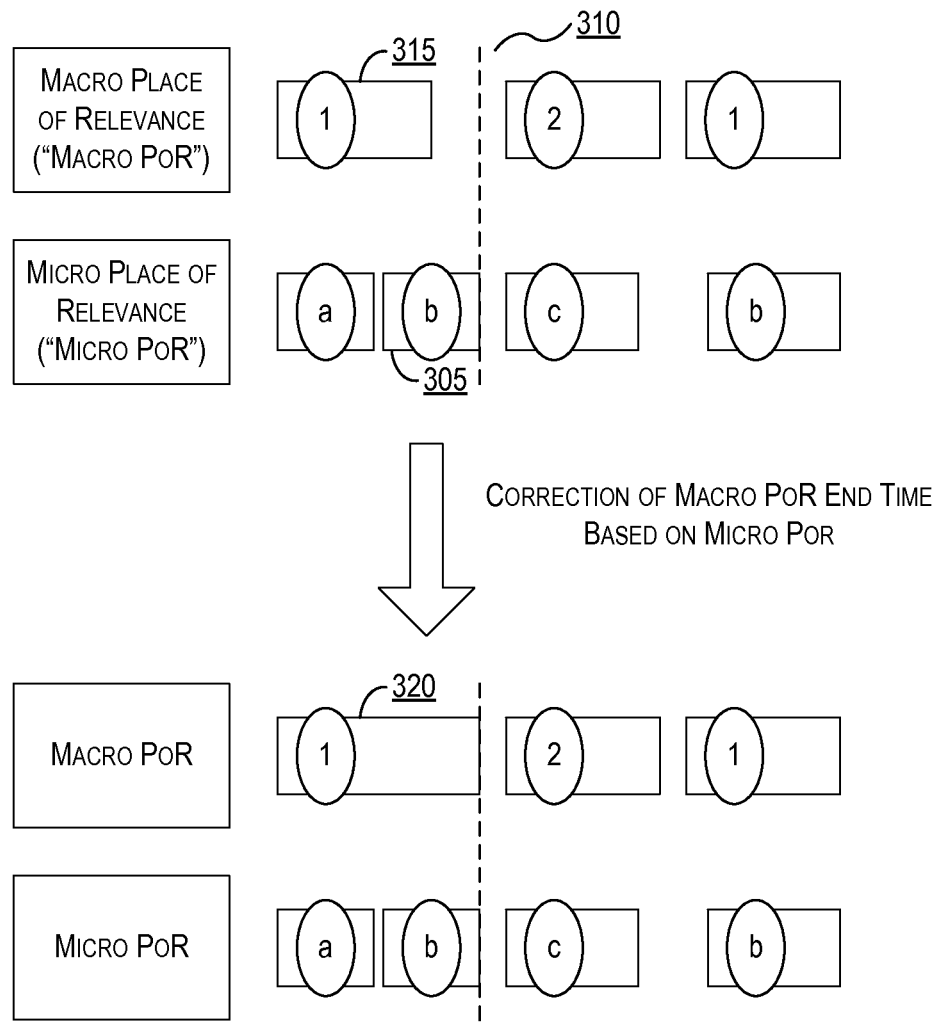
FIGS. 3-9 illustrate various examples of utilizing relationships between places of relevance according to one or more illustrative aspects of the disclosure.

In FIG. 3, an example is depicted which illustrates how, in some embodiments, a visit to a micro place of relevance can be used to correct an end time in information describing a corresponding visit to the macro place of relevance associated with the micro place of relevance. In particular, as seen in FIG. 3, information describing a visit 305 to a particular micro place of relevance may indicate that the visit 305 to the particular micro place of relevance concluded at a particular end time 310. Based on the information indicating that the visit 305 to the particular micro place of relevance concluded at a particular time 310, information describing a corresponding visit 315 to the macro place of relevance in which the micro place of relevance is included may be corrected in view of the information describing the micro place visit. In addition, the corrected end time for the visit to the macro place of relevance may be an attribute of the visit that is derived (e.g., by the mobile device visiting the micro place of relevance) based on measurement information obtained by the mobile device (e.g., signal measurement information that includes a WiFi signature and/or RF fingerprint which can be used in determining the identity of the micro place of relevance) and a place model that defines the relationship between the micro place of relevance and the macro place of relevance. Such an attribute of the visit may, for instance, be derived by attribute deriving subsystem 130 and/or by other components of system 100 which may be included in the mobile device visiting the micro place of relevance, and the measurement information may similarly be obtained by place of relevance information obtaining subsystem 125 and/or by other components of system 100.

For example, information describing a corrected visit 320 to the macro place of relevance may be generated to reflect that the visit to the particular macro place of relevance concluded at the same time 310 at which the corresponding visit 305 to the micro place of relevance concluded. In some embodiments, such information may be generated by a mobile device, such as a mobile device that is analyzing information about a micro place of relevance that it has visited and deriving an attribute of the visit to the micro place of relevance to obtain this correction. In other embodiments, this processing may be performed by a server that is located remotely from the mobile device and/or that is configured to assist the mobile device in analyzing information about places of relevance.

In instances in which such a correction is performed in real time (e.g., at the time when the mobile device is currently visiting the particular micro place of relevance), such a correction can allow the device to continue providing location aware functionalities, such as location-based content delivery, where such location aware functionalities are dependent on and/or otherwise tied to the macro place of relevance being visited (e.g., rather than being tied to the micro place of relevance being visited). In other words, detecting and recognizing the micro place of relevance, and subsequently deriving an attribute of the visit to the micro place of relevance (e.g., in order to determine the macro place of relevance being visited and the particular time(s) at which such a visit(s) is occurring), can enable the mobile device to provide location aware functionalities based on the device's detection and recognition of only the micro place of relevance (without necessarily detecting and recognizing the macro place of relevance). In addition, when such a correction is performed after a visit occurs, this correction can enable the mobile device to more accurately track historical data describing previous visits to micro places of relevance and macro places of relevance. Such data may, for instance, be used (e.g., by the mobile device) for any desired purposes, including targeted advertising.

Figure 4:
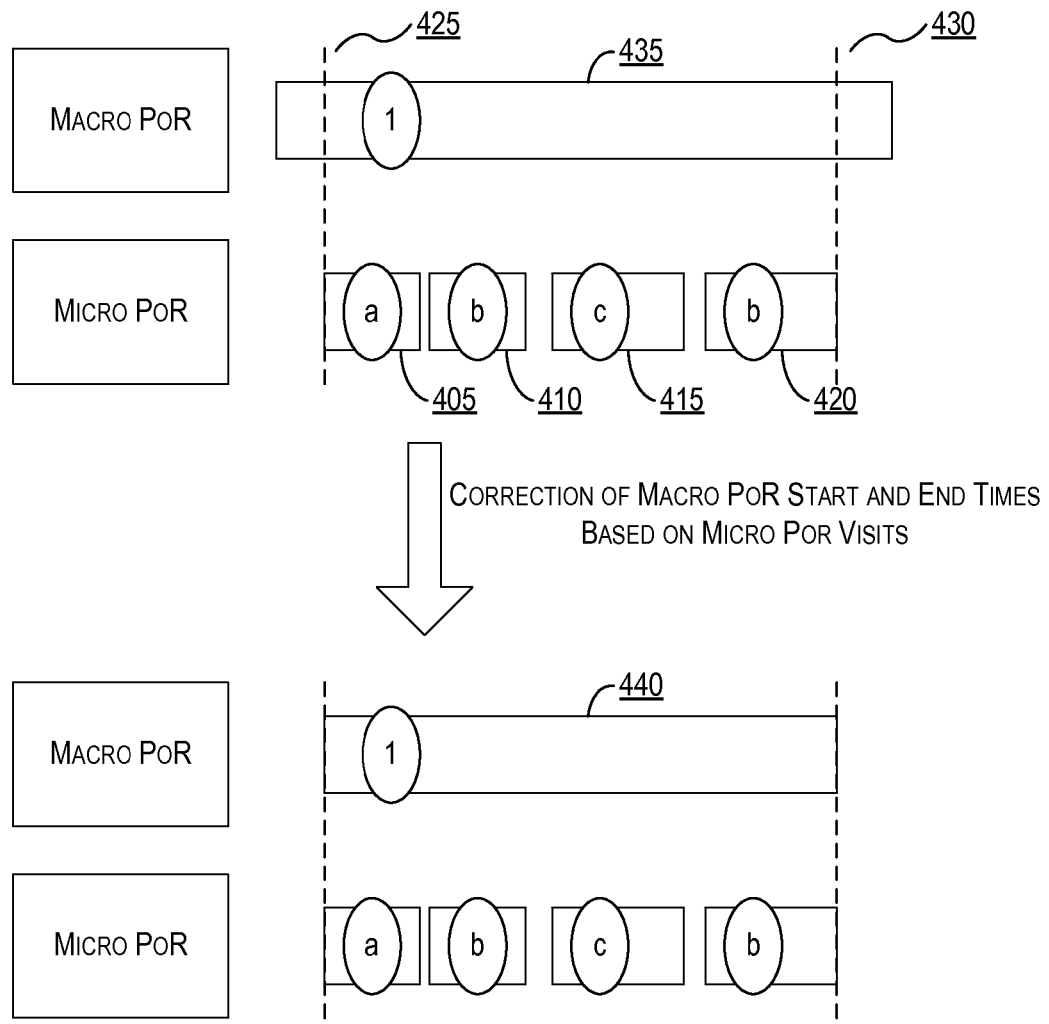

In FIG. 4, an example is depicted which illustrates how, in some embodiments, one or more visits to one or more micro places of relevance can be used in correcting both a start time and an end time for a visit to a corresponding macro place of relevance. In particular, as seen in FIG. 4, a mobile device may obtain a number of measurements (e.g., wireless signal measurements that include one or more WiFi signatures and/or RF fingerprints) upon which the mobile device may be able to identify a number of visits to various micro places of relevance. For example, based on the measurement information (e.g., which may be obtained by place of relevance information obtaining subsystem 125 and/or by other components of system 100 which may be included in the mobile device), the mobile device may be able to identify a first visit 405 to a first micro place of relevance, a second visit 410 to a second micro place of relevance, a third visit 415 to a third micro place of relevance, and a fourth visit 420 to the second micro place of relevance. In addition, based on place model data defining these micro places of relevance, as well as their relationships to one or more macro places of relevance, the mobile device may be able to determine that all of these micro places of relevance are associated with the same macro place of relevance. Furthermore, based on the measurement information obtained by the mobile device, the mobile device may be able to determine that the series of micro place visits started at a particular start time 425 and ended at a particular end time 430. By using the measurement information and the relationships defined in the place model, the mobile device can, in some embodiments, correct information describing the macro place visit 435 to reflect the actual start and end times of the macro place visit based on the measurements associated with the series of micro place visits. Such a correction may, for instance, be performed by attribute deriving subsystem 130 and/or by other components of system 100 that may be included in the mobile device.

For example, information describing a corrected visit 440 to the macro place of relevance may be generated to reflect that the visit to the particular macro place of relevance started at start time 425 (e.g., when the first micro place of relevance visit began) and ended at end time 430 (e.g., when the last micro place of relevance visit concluded). As in the previous examples discussed above, in some embodiments, this information may be generated, and corresponding analysis may be performed, by the mobile device itself, while in other embodiments, any part and/or all of this processing may be performed by a server that is configured to assist the mobile device in analyzing information about places of relevance.

Figure 5:
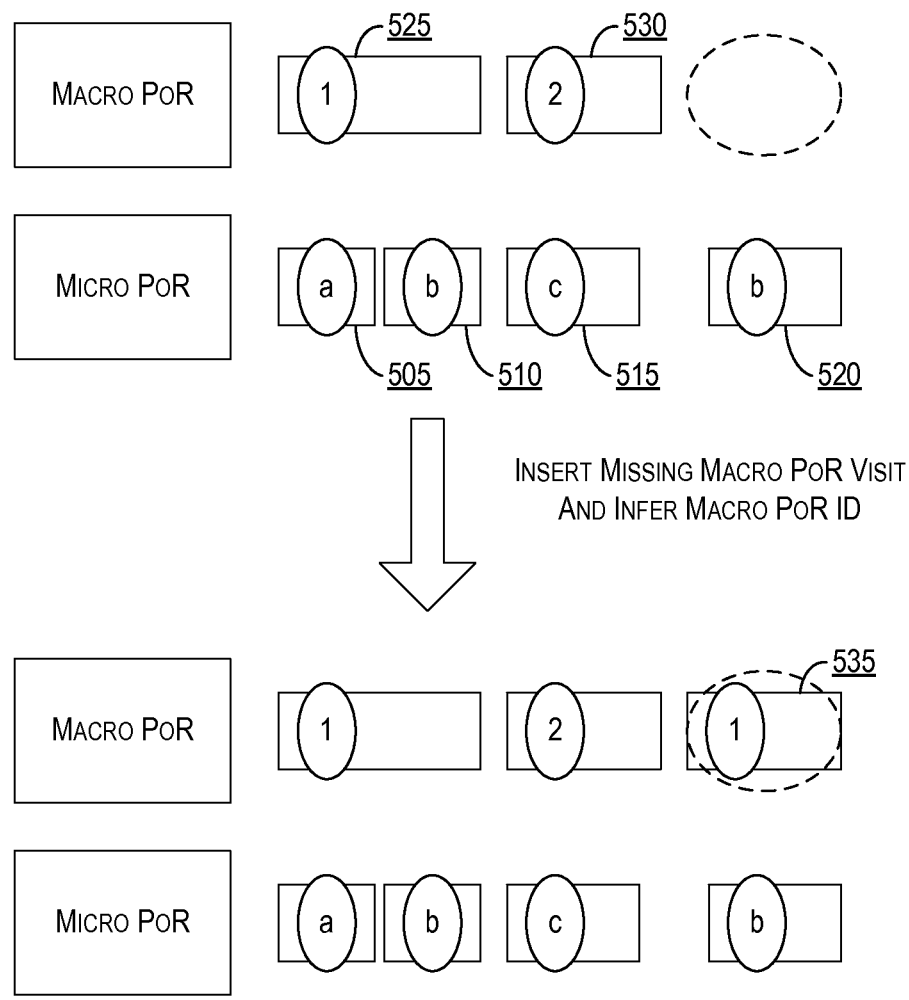

In FIG. 5, an example is depicted which illustrates how, in some embodiments, information about a visit to a micro place of relevance can be used to correct information about a visit to a macro place of relevance by filling in data for a visit to a macro place of relevance, where such information is missing. In particular, as seen in FIG. 5, a mobile device may be able to obtain a number of measurements (e.g., using place of relevance information obtaining subsystem 125 and/or other components of system 100 that may be included in the mobile device) which the mobile device can use to detect and/or recognize a number of micro place visits (e.g., a first visit 505 to a first micro place of relevance, a second visit 510 to a second micro place of relevance, a third visit 515 to a third micro place of relevance, and a fourth visit 520 to the second micro place of relevance). In addition, the mobile device may have measurements and/or other observed and/or determined information that identifies corresponding macro place visits (e.g., a first visit 525 to a first macro place of relevance and a second visit 530 to a second macro place of relevance). However, in this example, the observed and/or determined information for the macro place visits might not include information for a macro place visit corresponding to visit 520 to the second micro place of relevance. In this instance, the mobile device may be able to create and/or determine data for the missing macro place visit based, for instance, on measurement information associated with micro place visit 520 and a place model that defines the relationships between various micro places of relevance and various macro places of relevance. This creation and/or determination of data for the missing macro place visit may, for instance, be performed by attribute deriving subsystem 130 and/or by other components of system 100 which may be included in the mobile device.

For example, information describing a visit 535 to the first macro place of relevance can be generated and/or inserted into a timeline (e.g., a timeline that includes location tracking data associated with the mobile device and/or the user of the device) by the mobile device based on data indicating that, at the same times corresponding to the macro place visit being inserted, the mobile device obtained measurements indicating that the second micro place of relevance was being visited. And, using a place model that defines a relationship between the second micro place of relevance and the first macro place of relevance (e.g., specifying that the second micro place of relevance is included in the first macro place of relevance), the mobile device can generate and/or insert information to reflect that macro place visit 535 occurred. Thus, in some embodiments, a mobile device may be able to determine or correct missing information, such as the macro place visit 535. Further, the mobile device may be able to determine that the first macro place was visited without certain measurements. For example, in some embodiments, the mobile device may perform a WiFi scan, for example to detect a signature associated with the second micro place, and identify the visit to the second micro place at 520 based on the scan. If certain other measurements, such as GPS measurements, are unavailable to identify the first macro place, the first macro place visit may still be identified at 535 based on the scan and the place model. Similarly, the mobile device may turn off the GPS receiver or other sensors in order to conserve battery power when a macro place can be identified based on a micro place visit and a place model. As in the previous examples discussed above, this information may, in some embodiments, be generated by the mobile device itself, and in other embodiments, any part and/or all of this processing may be performed by a server that is configured to assist the mobile device in analyzing information about places of relevance.

As illustrated above, in the example depicted in FIG. 5, not only can the occurrence of a macro place visit be determined based on measurements associated with a micro place visit and a relevant place model, but the identity of the macro place of relevance that was visited can also be determined based on this information. In some instances, it is possible that the mobile device may be able to determine the occurrence of a macro place visit, but the mobile device might not be able to determine the identity of the macro place of relevance that was visited. For example, a place model being used by the mobile device might not include information that defines a relationship between a micro place of relevance that was visited and a macro place of relevance. An example of such a situation is discussed in greater detail below with respect to FIG. 6.

Figure 6:
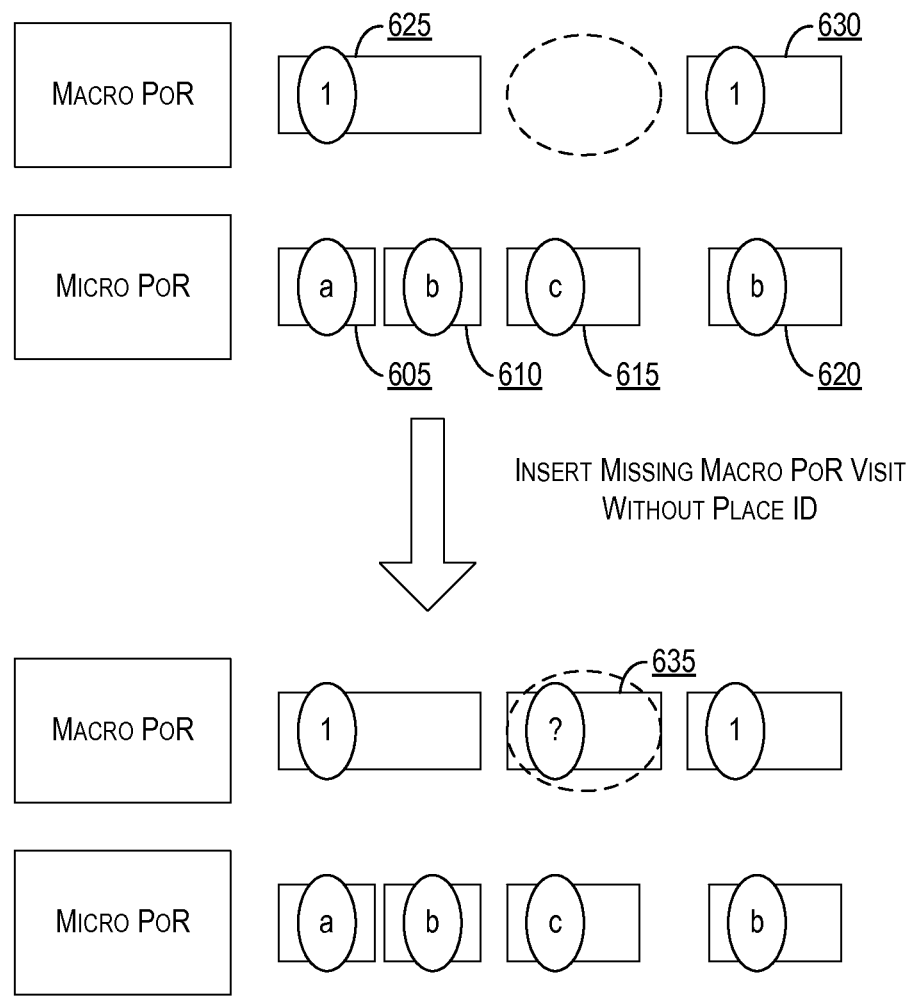

In particular, in the example illustrated in FIG. 6, a mobile device may have obtained a number of measurements indicating the occurrence of several micro place visits (e.g., a first visit 605 to a first micro place of relevance, a second visit 610 to a second micro place of relevance, a third visit 615 to a third micro place of relevance, and a fourth visit 620 to the second micro place of relevance). In addition, the mobile device may have obtained measurements and/or other observed and/or determined information that indicates the occurrence of some macro place visits corresponding to the micro place visits (e.g., a first visit 625 to a first macro place of relevance and a second visit 630 to the first macro place of relevance). Any and/or all of the information about the various visits to the various places of relevance may, for instance, be obtained by place of relevance information obtaining subsystem 125 and/or by other components of system 100 that may be included in the mobile device. However, in this example, the observed and/or determined information for the macro place visits might not include information for a macro place visit corresponding to visit 615 to the third micro place of relevance.

In this example, a place model being used by the mobile device might not define a relationship between the third micro place of relevance and any particular macro place of relevance. As a result, as seen in FIG. 6, the mobile device may be able to generate and/or insert into a timeline information describing the occurrence of a visit 635 to a macro place of relevance, but the mobile device might not be able to determine (and accordingly, might not be able to generate and/or insert) information specifying the identity of the macro place of relevance that was visited. The generation and/or insertion of this information into the timeline may, for example, be performed by attribute deriving subsystem 130 and/or by other components of system 100 that may be included in the mobile device.

In some instances, after an attribute of a macro place visit is derived based on measurement information about a corresponding micro place visit (e.g., after a missing macro place visit is inserted into a timeline or other tracking data associated with a mobile device and/or a user thereof), it may be the case that the macro place visit which is inserted represents a continuous portion of another macro place visit, such as a continuous portion of a macro place visit that precedes or follows the inserted macro place visit. In these instances, a macro place visit that is inserted may be merged with a preceding or following macro place visit, where, for instance, the sequential macro place visits were made to the same macro place of relevance. An example of such a situation is illustrated in FIG. 7 and discussed in greater detail below.

Figure 7:
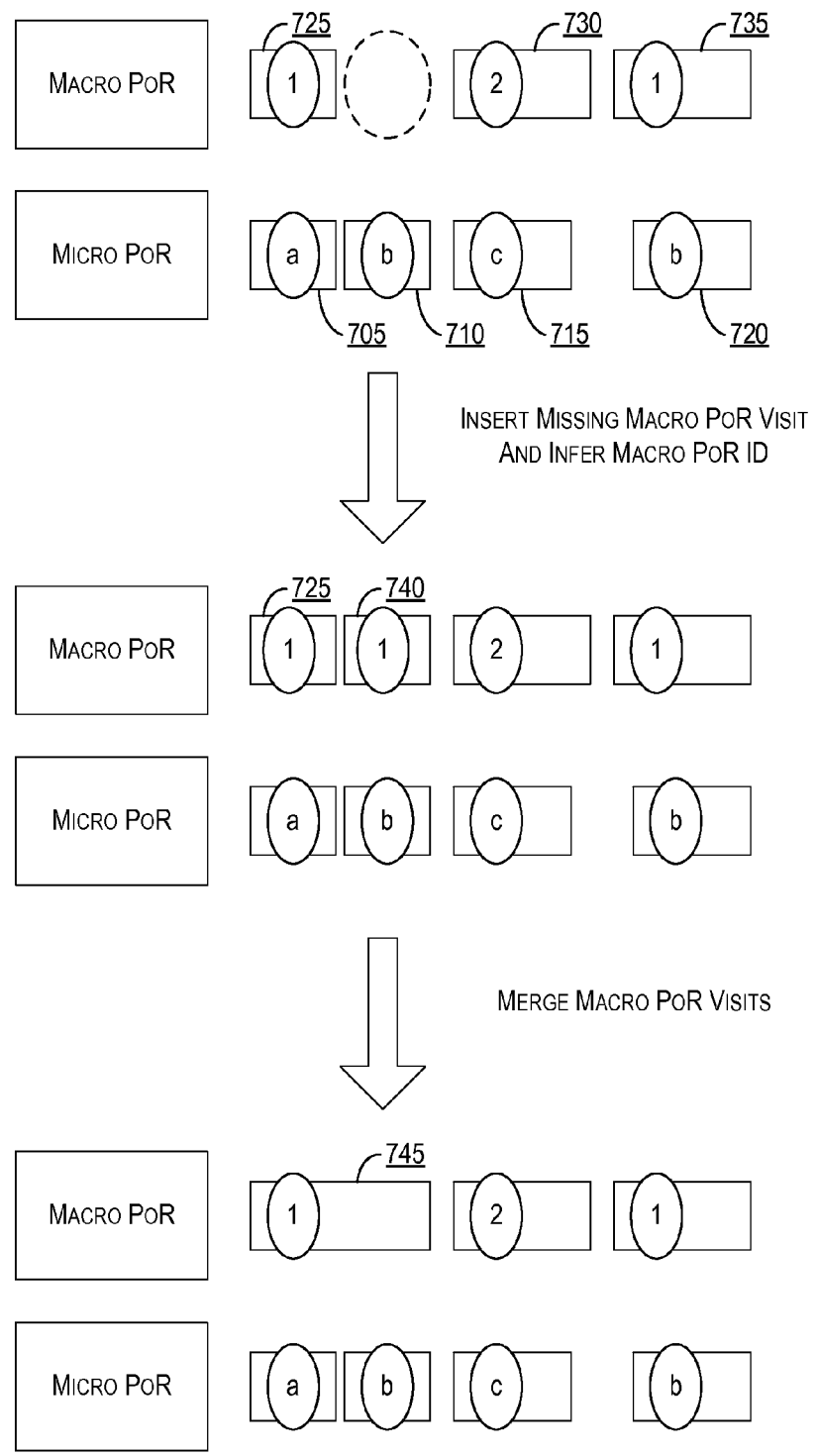

In particular, in the example illustrated in FIG. 7, a mobile device may have obtained a number of measurements indicating the occurrence of several micro place visits (e.g., a first visit 705 to a first micro place of relevance, a second visit 710 to a second micro place of relevance, a third visit 715 to a third micro place of relevance, and a fourth visit 720 to the second micro place of relevance). In addition, the mobile device may have obtained measurements and/or other observed and/or determined information that indicates the occurrence of some macro place visits corresponding to the micro place visits (e.g., a first visit 725 to a first macro place of relevance, a second visit 730 to a second macro place of relevance, and a third visit 735 to the first macro place of relevance). Any and/or all of the information about the various visits to the various places of relevance may, for instance, be obtained by place of relevance information obtaining subsystem 125 and/or by other components of system 100 that may be included in the mobile device. Here again, however, the observed and/or determined information for the macro place visits in this example might not include information for a macro place visit corresponding to one or more of the micro place visits (e.g., visit 710 to the second micro place of relevance). As in the examples discussed above, based on a place model being used by the mobile device that defines a relationship between the second micro place of relevance and the first macro place of relevance, information describing a visit 740 to the first macro place of relevance can be generated and/or inserted into a timeline by the mobile device (e.g., by attribute deriving subsystem 130 and/or by other components of system 100 which may be included in the mobile device), in view of information indicating that during the times of the macro place visit being inserted, the mobile device obtained measurements indicating that the second micro place of relevance was being visited.

Notably, in this example, the first visit 705 to the first micro place of relevance and the second visit 710 to the second micro place of relevance both correspond to visits to the same macro place of relevance, namely, the first macro place of relevance in this example. Because macro place visits 725 and 740 are sequential macro place visits to the same macro place of relevance, the mobile device can merge the visits into a single macro place visit 745. This can allow the mobile device to generate, determine, and/or maintain tracking information which reflects that, while the user sequentially visited several micro places of relevance, namely, the first micro place of relevance and the second micro place of relevance in this example, both of these visits were made while the mobile device and/or the user thereof were also located at the first macro place of relevance.

Figure 8:
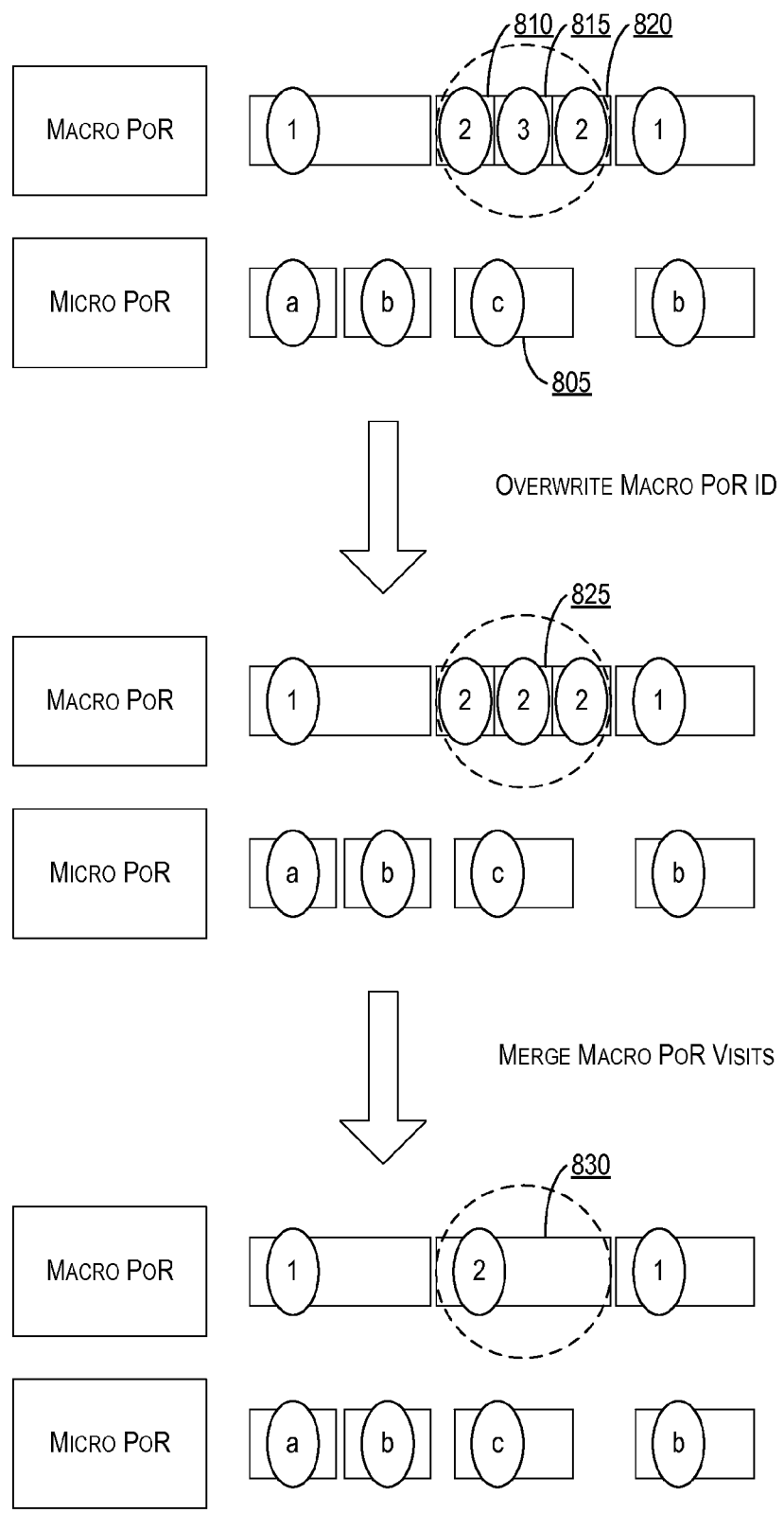

In some embodiments, information about a micro place visit may be used to correct other information about a macro place visit. For example, the measurements and/or other data used in identifying micro place visits (e.g., signal measurement information that includes one or more WiFi signatures and/or RF fingerprints) may, in some instances, be considered more reliable than the information that is used in determining and/or otherwise identifying macro place visits (e.g., satellite positioning signals, cellular signals, etc.). In instances where information about a micro place visit does not match with information about a corresponding macro place visit, a mobile device can, in some embodiments, use the information about the micro place visit, along with relevant place model data, to overwrite the information associated with the non-matching macro place visit. An example of this situation is illustrated in FIG. 8 and discussed in greater detail below. Although not illustrated, a macro place visit may also be used to determine that a micro place visit was incorrectly determined, or may be used to update the place model. For example, a macro place of relevance may initially be associated with a first micro place of relevance, but it may later be determined that the macro place of relevance is more likely associated with a second micro place of relevance.

In the example illustrated in FIG. 8, a mobile device may have obtained a number of measurements indicating the occurrence of several micro place visits, including a third visit 805 to a third micro place of relevance. In addition, the mobile device may have obtained measurements and/or other observed and/or determined information indicating the occurrence of several macro place visits, including a second visit 810 to a second macro place of relevance, a third visit 815 to a third macro place of relevance, and a fourth visit 820 to the second macro place of relevance. Any and/or all of the information about the various visits to the various places of relevance may, for instance, be obtained by place of relevance information obtaining subsystem 125 and/or by other components of system 100 that may be included in the mobile device. In this example, however, place model data, which may define one or more relationships between the third micro place of relevance and a particular macro place of relevance, may indicate that the third micro place of relevance (e.g., associated with micro place visit 805) in fact corresponds to the second macro place of relevance (e.g., associated with macro place visits 810 and 820). In this instance in which the mobile device detected the occurrence of macro place 815, but presumably incorrectly determined the identity of the macro place of relevance that was visited, the mobile device may overwrite identification information associated with the non-matching macro place visit (e.g., macro place visit 815) to obtain a corrected macro place visit 825. Thereafter, the mobile device may merge the corrected macro place visit 825 with the preceding macro place visit 810 and the subsequent macro place visit 820, as all of these sequential macro place visits are associated with the same macro place of relevance. In this way, the mobile device may obtain a merged macro place visit 830, as seen in FIG. 8. In addition, the overwriting of the identification information and/or the merging of the macro place visits may, for example, be performed by attribute deriving subsystem 130 and/or by other components of system 100 which may be included in the mobile device.

In some instances in which a mobile device corrects a macro place visit by overwriting identification information associated with a previously determined and/or otherwise recognized macro place visit, the initial error may arise for a variety of reasons. For example, such an error may arise from poor signal information captured by the mobile device, incorrect evaluation and/or other faulty analysis performed by the mobile device, erroneous mapping information, and/or other reasons. Nevertheless, in some embodiments, before correcting a macro place visit by overwriting information about another macro place visit, the mobile device may first determine a confidence level for the relationship between the micro place of relevance that was recognized and the macro place of relevance that is to overwrite, at least in part, the existing macro place visit. Such a confidence level in the relationship between the micro place of relevance and the macro place of relevance may, for instance, be based on the number of times that the particular mobile device and/or one or more other mobile devices have observed the relationship. For example, the greater the number of times that the mobile device and/or one or more other mobile devices have observed a particular relationship between the micro place of relevance and the macro place of relevance (e.g., that the micro place of relevance is included within the macro place of relevance), then the higher the confidence level may be for the relationship between these places of relevance. In some arrangements, information about the confidence level for each relationship between a micro place of relevance and a macro place of relevance may be stored and/or otherwise included in a place model associated with the places of relevance. In some embodiments, a confidence level may be determined based a similarity between measured signals and signals stored in the place model and/or based on a distance between observed and expected signal or other environmental measurements.

In addition, in some embodiments, the mobile device might only overwrite and/or otherwise correct a macro place visit if the mobile device can determine that the confidence level for the relationship (e.g., the relationship, as defined in a place model, between the recognized micro place of relevance and the macro place of relevance that is to be inserted and/or otherwise used in overwriting an existing macro place visit) exceeds a certain threshold. This may, for instance, allow the mobile device to avoid overwriting macro place visits in instances where the place model itself includes erroneous information about the relationship between a micro place of relevance and a macro place of relevance, and the mobile device in fact recognized both a correct micro place visit and a correct macro place visit.

In some embodiments, a place model might not include information defining macro place relationships for all of the micro places of relevance that a mobile device may visit. In some instances, however, a mobile device may be able to infer the existence of a relationship between a micro place of relevance and a particular macro place of relevance, based on similarities between the measured and/or observed information for the micro place of relevance (e.g., the information which may be used by the mobile device in identifying the micro place of relevance) and the measured and/or observed information for another micro place of relevance for which a macro place relationship is defined in relevant place model data. In particular, a relaxed threshold for micro place recognition may be used by the mobile device in these instances, so as to associate one micro place visit with another micro place visit. In using such a relaxed threshold, the mobile device may, for instance, determine that two micro places of relevance which are identified based on signals transmitted by at least one common device (e.g., at least one shared access point) are associated with the same macro place of relevance, even where the relevant place model data specifies a relationship between only one of the micro places of relevance and the particular macro place of relevance. An example of this situation is illustrated in FIG. 9 and discussed in greater detail below.

Figure 9:
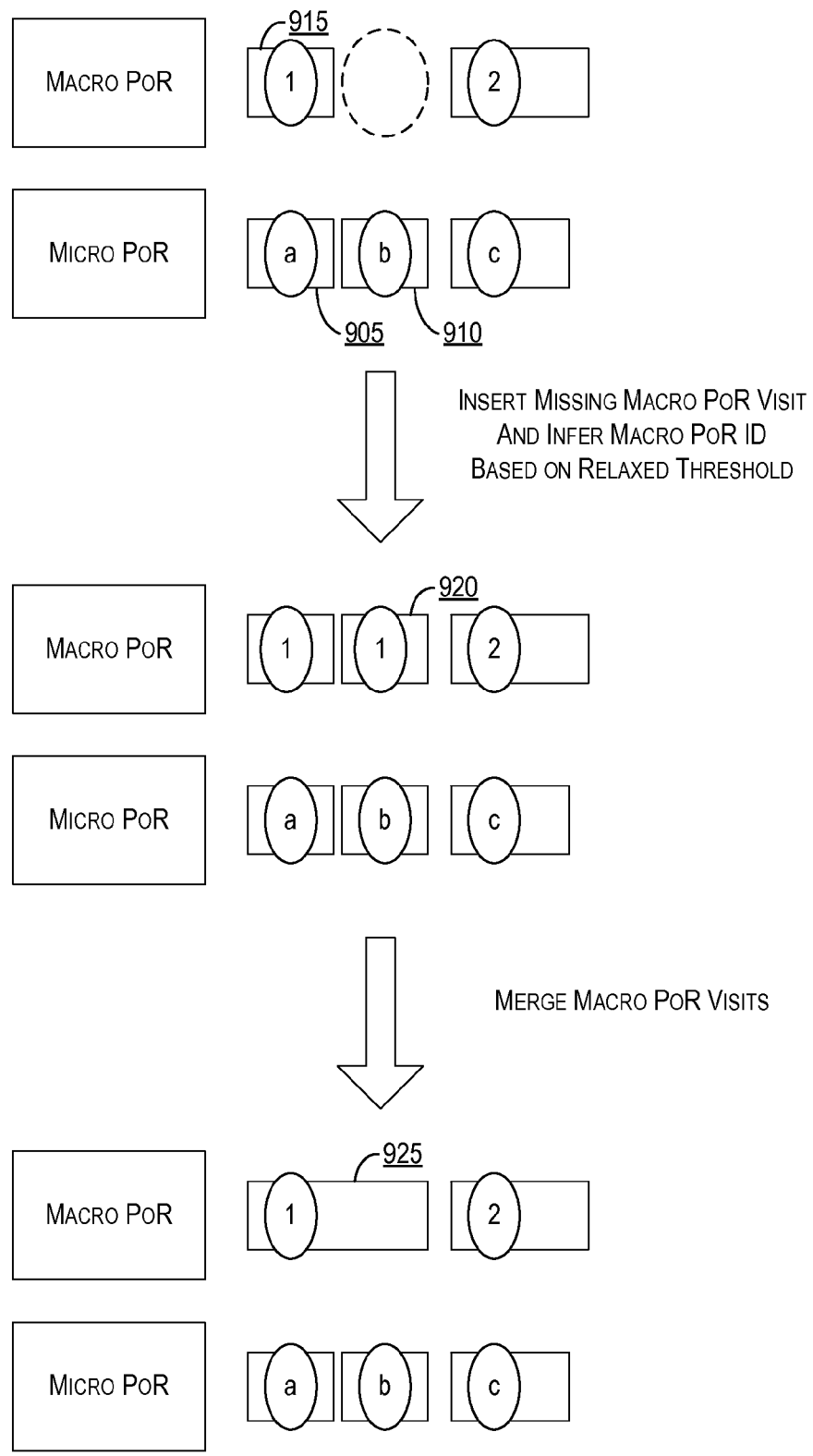

In particular, in the example illustrated in FIG. 9, a mobile device may have obtained a number of measurements indicating the occurrence of several micro place visits, including a first visit 905 to a first micro place of relevance and a second visit 910 to a second micro place of relevance. In addition, the mobile device may have obtained measurements and/or other observed and/or determined information indicating the occurrence of several macro place visits, including a first visit 915 to a first macro place of relevance. Any and/or all of the information about the various visits to the various places of relevance may, for instance, be obtained by place of relevance information obtaining subsystem 125 and/or by other components of system 100 that may be included in the mobile device. In this example, however, the observed and/or determined information for the macro place visits might not include information for a macro place visit corresponding to micro place visit 910 to the second micro place of relevance. Additionally, in this example, the place model data that is being used by the mobile device might not define a relationship between the second micro place of relevance (e.g., corresponding to micro place visit 910) and any macro place of relevance.

Nevertheless, it may be the case that the second micro place of relevance (e.g., associated with micro place visit 910) can be identified by the mobile device using signals that are sufficiently similar to the signals used by the mobile device in identifying the first micro place of relevance (e.g., associated with micro place visit 905), such that the mobile device may consider the second micro place of relevance to also be included in the same macro place of relevance as the first micro place of relevance. Thus, the mobile device may determine (e.g., using attribute deriving subsystem 130 and/or other components of system 100 that may be included in the mobile device) that the second micro place of relevance is also included in the first macro place of relevance (e.g., corresponding to macro place visit 915). In this example, the signals used by the mobile device in identifying the first micro place of relevance and the second micro place of relevance may be considered sufficiently similar because, for instance, signals transmitted by one wireless access point and used by the mobile device in identifying the first micro place of relevance are also used by the mobile device in identifying the second micro place of relevance. Other similarities may, in other embodiments, allow for similar inferences instead of and/or in addition to the micro places of relevance being identified by the mobile device using signals transmitted by at least one common device. For instance, in some embodiments, signals may be considered sufficiently similar to allow for a relationship to be inferred between two or more micro places of relevance based on a distance metric for associated signal signatures meeting a certain threshold, other comparisons of expected and/or measured RSSI and/or heat map values, and/or other factors.

By inferring some association between the second micro place of relevance and the first micro place of relevance in this way, the mobile device may be able to generate and/or insert, into a timeline, information describing the occurrence of a macro place visit 920 to the first macro place of relevance, in view of the measurements associated with micro place visit 910 to the second micro place of relevance. Thereafter, the mobile device may merge macro place visit 920 with macro place visit 915 to obtain a merged macro place visit 925, based on these macro place visits being sequential visits to the same macro place of relevance.

In some instances, a mobile device may determine not to merge and/or otherwise combine macro place visits, even where such macro place visits are sequential visits to the same macro place of relevance. For example, in some instances, gaps between information about macro place visits may reflect periods of time in which the mobile device and/or the user are in another place and/or in another state (e.g., a motion state of driving and/or otherwise traveling to and/or from different places). In other instances, when a mobile device and/or the user of the device are traveling and/or otherwise moving between places, information about micro places of relevance and/or macro places of relevance that are recognized and/or otherwise determined by the mobile device during such movement may be tagged with and/or otherwise made to include additional data reflecting that such information was captured in a movement state. These tags and/or other additional data may, for instance, enhance the robustness of place of relevance information and/or place model information being collected and/or used by the mobile device, as information captured during a movement state may, for example, associate an incorrect radius with the place of relevance being recognized and/or otherwise observed.

As discussed above, a place model may, in some embodiments, include information about various macro places of relevance and various micro places of relevance, and additionally may include information that defines one or more relationships between one or more particular micro places of relevance and one or more macro places of relevance. In some embodiments, such a place model may be derived and/or otherwise formed, and places of relevance may be come to be associated, as a user visits new places with his or her mobile device. Each place may have some semantic relevance to the user (e.g., the user's office, the user's home, the user's gym, etc.), and the semantic relevance of a particular place might not be dependent on the location of the place on a map. When, for instance, a user visits a new place, the mobile device may identify the user's visit to the new place, and optionally, may determine the semantic relevance of the place to the user (e.g., so as to automatically assign a label to the place based on its semantic relevance). In addition, the mobile device may identify re-visits to the place, as well as the frequency and duration of visits to the place. The mobile device also may identify macro places of relevance and micro places of relevance associated with the place, as well as the mapping between the various macro places of relevance and micro places of relevance. Any and/or all of the information that the mobile device identifies and/or otherwise determines in providing these functionalities may be stored in and/or otherwise included in a place model associated with the place.

In some embodiments, using information in the place model and/or other information about places of relevance, a mobile device can identify visits to micro places of relevance, for instance, by observing and/or analyzing wireless signals (e.g., wireless LAN signals). For example, a micro place visit may be extracted and/or otherwise determined using a distance metric that, in some arrangements, can be used in comparing a WiFi signature that has been and/or is currently being observed by the mobile device with WiFi signature information that is included in the place model and/or that uniquely identifies different micro places of relevance. In some instances, a distance metric that may be used in clustering may be the Tanimoto distance, and the RSSI values of WiFi access points observed by the mobile device may be evaluated against place model information for a particular place of relevance. While the Tanimoto distance is provided as an example of a distance metric that can be used, other distance metrics (e.g., Hamming, Euclidian, Jaccard, Dice, Cosine, etc.) can also be used instead of and/or in addition to the Tanimoto distance. In addition, various techniques may be used in clustering and/or otherwise grouping measurements obtained at different physical points in a place into a micro place visit.

For example, in some embodiments, an online clustering method, which may provide real-time discovery and recognition of places of relevance, can be used (e.g., by a mobile device) in clustering and/or otherwise grouping measurements obtained at different physical points in a place into a micro place visit. For instance, WiFi information about a current visit may be created from consecutive WiFi scans (e.g., micro fixes) that are obtained within a particular minimum scan time. Then, the information about the current visit may be matched to a particular place of relevance if the distance (e.g., distance metric, such as the Tanimoto distance) between the information about the current visit and information about the centroid of the place of relevance is less than a predefined recognition distance threshold, and further if this distance is the minimum distance among all existing places of relevance (e.g., as may be defined in the place model). Thereafter, the mobile device may determine that a place of relevance has been entered if the duration of the current visit exceeds a predefined minimum stay time. Additionally, the mobile device may create a new place of relevance associated with the current visit if there are no existing places of relevance defined within the predefined recognition distance threshold. Further, the mobile device may determine that the place of relevance has been exited if the information about the current visit and a current micro fix indicate that the predefined recognition distance threshold is no longer met, and further that the duration of the current visit has exceeded a predefined discovery merge time.

In addition, in some embodiments, different methods may be used in evaluating how accurately a mobile device extracts and/or otherwise determines visits to different places of relevance, such as different micro places of relevance. For example, in some instances, a discrete discovery method may be used to evaluate micro place extraction, in which the number of correctly discovered micro place visits is compared to the actual (e.g., ground truth) number of micro place visits (e.g., thereby accounting for missing place visits, divided place visits, merged place visits, and/or one-to-one mapping of discovered place visits to ground truth place visits). In other instances, a time-based discovery method may be used to evaluate micro place extraction, in which the duration of extracted micro place visits and/or the time alignment of extracted micro place visits is compared with the actual (e.g., ground truth) duration of micro place visits and/or the actual (e.g., ground truth) start and end times of micro place visits. In still other instances, a discrete recognition method may be used to evaluate micro place extraction, in which the accuracy at which the mobile device is able to recognize different places of relevance (e.g., as compared to ground truth visits to different places of relevance) is evaluated. Certain of these methods may be performed based on input or action of the user, and/or by using a technician to evaluate ground truth, for example to train the subsystem 125 and/or 130 prior to deployment to a user.

Further, in some embodiments, a number of parameters may be defined for cleansing data associated with place visits, temporal clustering of place visits (e.g., to discover new places), and similarity clustering of place visits (e.g., to recognize new places). In addition, the parameters for these values may be different as between macro place visits and micro place visits.

In some embodiments, any and/or all of the functions discussed above may be performed at a server or by a mobile device (e.g., which may incorporate and/or otherwise implement system 100 and/or one or more subsystems thereof), or using a combination thereof. Thus, it might not be required for the mobile device to transmit data and/or measurements to one or more servers, for instance, to associate GPS readings or other coordinates-based positions with particular points of interest and/or other locations. In this way, place models may be constructed and/or maintained at a mobile device in some embodiments. In certain of these embodiments, construction of the place model(s) and identification of micro and/or macro place visits may be performed at the mobile device without communication with a central server.

Figure 10:
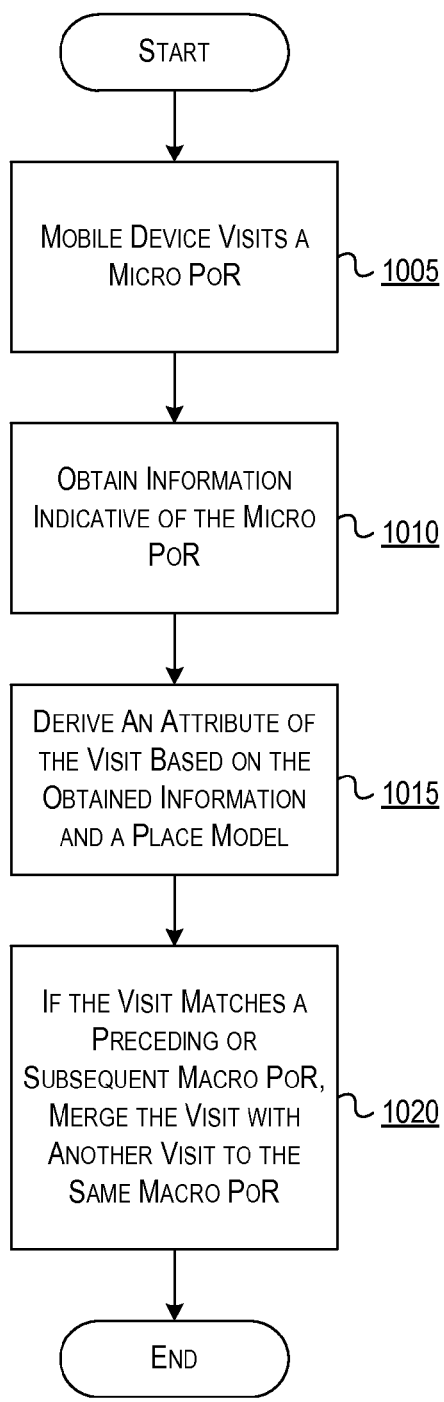
FIG. 10 illustrates a flowchart that depicts an example method of utilizing relationships between places of relevance according to one or more illustrative aspects of the disclosure.

FIG. 10 illustrates a flowchart that depicts an example method of utilizing relationships between places of relevance according to one or more illustrative aspects of the disclosure. The processing illustrated in FIG. 10 may be implemented in software (e.g., computer-readable instructions, code, programs, etc.) that can be executed by one or more processors and/or other hardware components. Additionally or alternatively, the software can be stored on a non-transitory computer-readable storage medium.

As seen in FIG. 10, the method may be initiated in step 1005, in which a mobile device may visit a micro place of relevance. For example, in step 1005, a mobile device may visit an area and/or other space that it has previously visited and/or obtained identifying measurements about, such as wireless signal measurements that the mobile device can use to uniquely identify the micro place of relevance (e.g., a WiFi signature and/or an RF fingerprint).

In step 1010, the mobile device may obtain information indicative of the micro place of relevance. For example, in step 1010, the mobile device may take one or more signal measurements in order to determine the identity of the micro place of relevance being visited. As discussed above, these signal measurements may include measuring wireless signal information so as to obtain a WiFi signature and/or an RF fingerprint. Additionally, in obtaining information indicative of the micro place of relevance, the mobile device may compare the measured information (e.g., the signal measurements being taken by the mobile device) with previously stored information that correlates particular measurements with particular micro places of relevance. Furthermore, in obtaining information indicative of the micro place of relevance being visited in step 1010, the mobile device also may record a start time and/or an end time for the micro place visit. This information may, for instance, allow the mobile device to determine a time duration of the micro place visit. In addition, the mobile device may, in some instances, incorporate and/or otherwise implement system 100 and/or one or more subsystems thereof Thus, in some instances, the mobile device may obtain information indicative of the micro place of relevance using place of relevance information obtaining subsystem 125.

In step 1015, the mobile device may derive an attribute of the micro place visit based on the information obtained in step 1010 and a place model. As discussed above, such a place model may, for instance, define a relationship between the micro place of relevance being visited and a particular macro place of relevance. For example, the place model may specify that the micro place of relevance being visited is physically located inside of and/or otherwise included in a particular macro place of relevance. In addition, in deriving an attribute of the micro place visit in step 1015, the mobile device may perform any and/or all of the actions described above with respect to the examples illustrated in FIGS. 3-9. For example, in deriving an attribute of the micro place visit in step 1015, the mobile device may correct an end time for a macro place visit based on the micro place visit, the mobile device may correct start and end times for a macro place visit based on one or more micro place visits, the mobile device may insert the occurrence of a missing macro place visit with or without inferring the identity of the macro place of relevance that was visited, the mobile device may overwrite and/or otherwise correct a macro place visit based on the micro place visit, and/or the mobile device may insert a missing macro place visit using a relaxed micro place recognition threshold. In addition, the mobile device may, in some instances, incorporate and/or otherwise implement system 100 and/or one or more subsystems thereof Thus, in some instances, the mobile device may derive an attribute of the micro place visit using attribute deriving subsystem 130 and/or place model information 120.

As discussed above, in some embodiments, deriving an attribute of the micro place visit (e.g., in step 1015) may include and/or further comprise correcting an error in a macro place visit and/or otherwise performing error correction with respect to place of relevance data and/or place model information. For example, in correcting an error to a macro place visit, the mobile device may correct an end time for the macro place visit (e.g., based on determining that a corresponding micro place visit concluded at a particular time). As another example, in correcting an error to a macro place visit, the mobile device may correct a start time for the macro place visit (e.g., based on determining that a corresponding micro place visit started at a particular time). In still another example, in correcting an error to a macro place visit, the mobile device may correct the occurrence and/or the identity of the macro place visited (e.g., based on determining, based on relevant place model information, that a micro place visit has a particular relationship to and/or is otherwise associated with a particular macro place of relevance). In other instances, in performing error correction, the mobile device can, for instance, correct place model data itself (e.g., based on determining that a previously defined relationship between a particular micro place of relevance and a particular macro place of relevance is no longer applicable and/or valid).

Subsequently, in optional step 1020, if the mobile device determines that the macro place visit being analyzed matches a preceding or subsequent macro place visit, then the mobile device may merge the macro place visit with the other, sequential macro place visit. For example, in step 1020, the mobile device can merge one macro place visit with another macro place visit, as in the examples discussed above with respect to and illustrated in FIGS. 7-9.

In some embodiments, various steps may be added to, or omitted from, the example method discussed above with respect to FIG. 10. For example, in some embodiments, a process may include the steps illustrated in FIG. 11.

Figure 11:
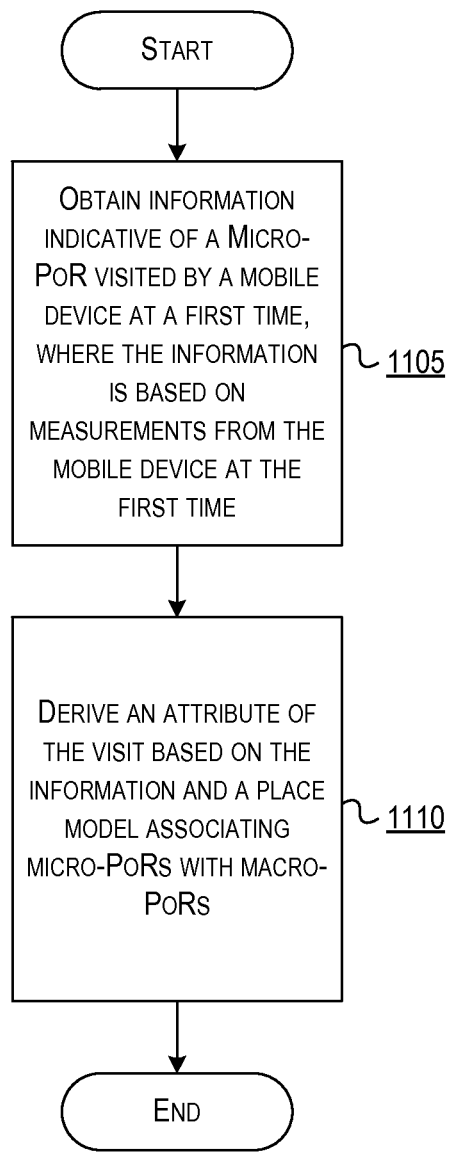
FIG. 11 illustrates a flowchart that depicts another example method of utilizing relationships between places of relevance according to one or more illustrative aspects of the disclosure.

FIG. 11 illustrates a flowchart that depicts another example method of utilizing relationships between places of relevance according to one or more illustrative aspects of the disclosure. The processing illustrated in FIG. 11 may be implemented in software (e.g., computer-readable instructions, code, programs, etc.) that can be executed by one or more processors and/or other hardware components. Additionally or alternatively, the software can be stored on a non-transitory computer-readable storage medium.

As seen in FIG. 11, the method may be initiated in step 1105, in which information indicative of a micro place of relevance visited by a mobile device at a first time may be obtained. The information may, for instance, be based on measurements from the mobile device at the first time. For example, such measurements may include data collected via one or more WiFi scans performed by the mobile device, such as one or more scans performed by place of relevance information obtaining subsystem 125 and/or one or more other components of system 100 which may be incorporated into the mobile device.

In step 1110, an attribute of the visit may be derived based on the information and a place model associating micro places of relevance with macro places of relevance. Deriving such an attribute may, for instance, include performing one or more of the functions discussed above. In addition, the place model may, for instance, define relationships between various micro places of relevance and various macro places of relevance, as also discussed above. In some embodiments, such an attribute may be derived, for instance, by attribute deriving subsystem 130 and/or one or more other components of system 100 which may be incorporated into the mobile device.

While several illustrative embodiments have been described above, other additional and/or alternative embodiments are also considered as being within the scope of the present disclosure. For example, in some embodiments, a mobile device can generate place model data as new micro places of relevance are encountered. In addition, the mobile device may be configured to allow a user of the device to define labels for micro places of relevance and macro places of relevance. Some places of relevance may be designated as public (e.g., such that they are defined for all users of the device and/or users of other devices), while other places of relevance may be designated as private.

In some arrangements, a user may be able to share information about one or more places of relevance with one or more other users of the device and/or users of other devices. In other additional and/or alternative arrangements, a place model being used by a mobile device may include public information about places of relevance (e.g., information that is defined for all users of the device and/or users of other devices), as well as user-specific information about particular places of relevance (e.g., which may only be defined and/or used by the mobile device for one particular user).

As discussed above, in some embodiments, all of the processing involved in the examples illustrated in FIGS. 3-9 and/or in the example method illustrated in FIG. 10 may be performed on and/or otherwise by the mobile device (e.g., system 100) itself. In other embodiments, however, some and/or all of this processing may be performed by one or more remote servers that are configured to assist the mobile device in utilizing relationships between places of relevance. Notably, by implementing one or more of the embodiments discussed above in which processing is performed entirely or substantially on the mobile device, better privacy protection may be provided to a user of the device, as information about places of relevance visited by the user might not leave the mobile device. Additionally, one or more servers might not obtain and/or otherwise receive location information that the user might not wish to share. For example, a user of a mobile device may be able to define certain private places of relevance that might not be shared with any other user or any other device, including such a remote server.

In addition to providing more enhanced privacy to a user, various embodiments discussed above may also allow a mobile device to conserve more power. For example, a mobile device may, in some embodiments, conserve power resources by relying on more power-efficient techniques of determining a rough idea of the device's current location, such as WiFi fingerprints and/or RF signatures, instead of using more power-hungry techniques that may use satellite navigation signals and/or cellular signals. In addition, a mobile device may, in some embodiments, use communication resources more efficiently. In particular, by performing some or all of the processing described above entirely on or substantially on the mobile device, the mobile device may be able to reduce the amount of information that is communicated to one or more remote servers and/or other devices.

Having discussed a number of embodiments, an example of a computer system in which one or more of these embodiments can be implemented will now be described with respect to FIG. 12.

Figure 12:
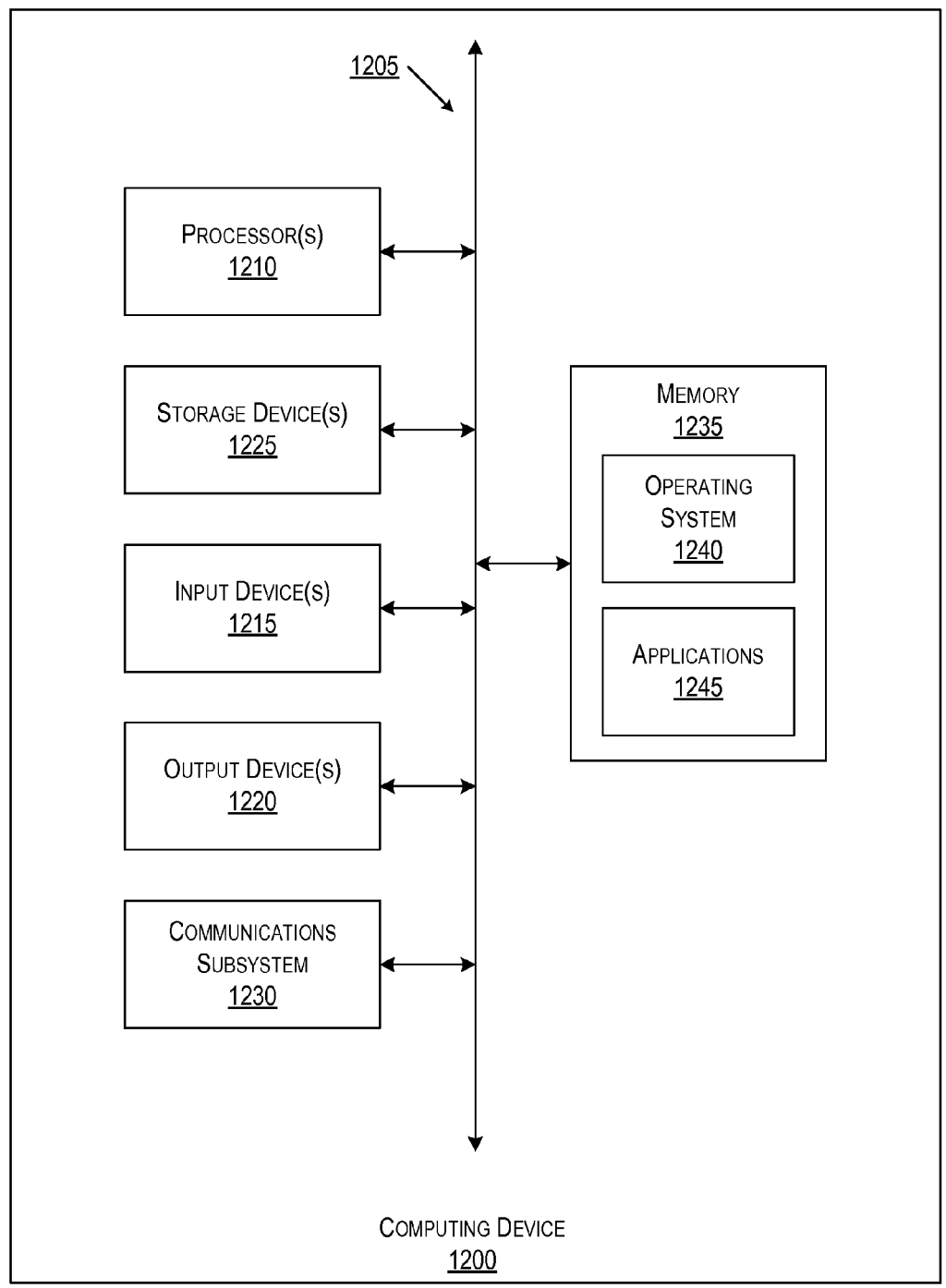
FIG. 12 illustrates an example of a computing system in which one or more embodiments may be implemented.

FIG. 12 illustrates an example of a computing system in which one or more embodiments may be implemented. In some embodiments, a computer system 1200 as illustrated in FIG. 12 may be incorporated as part of a computing device, which may implement, perform, and/or execute any and/or all of the features, methods, and/or method steps described herein. For example, computer system 1200 may represent some of the components of a mobile device, a server, or any other computing device, such as a laptop computer, a tablet computer, a smart phone, or a desktop computer. In addition, computer system 1200 may represent some of the components of system 100 of FIG. 1 (e.g., memory 1235 may represent memory 115; input devices 1215 and output device 1220 may represent input/output subsystem 105; processor 1210 and/or memory 1235 may provide one or more of the various subsystems of system 100 discussed above, such as place of relevance information obtaining subsystem 125 and/or attribute deriving subsystem 130; communications subsystem 1130 may represent communications subsystem 110; etc.). FIG. 12 provides a schematic illustration of one embodiment of a computer system 1200 that can perform the methods provided by various other embodiments, as described herein. FIG. 12 is meant only to provide a generalized illustration of various components, any and/or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, and/or the like); one or more input devices 1215, which can include without limitation a camera, a mouse, a keyboard and/or the like; and one or more output devices 1220, which can include without limitation a display unit, a printer and/or the like.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1200 might also include a communications subsystem 1230, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1230 may permit data to be exchanged with a network (such as the network described below, to name one example), other computer systems, and/or any other devices described herein. In many embodiments, the computer system 1200 will further comprise a non-transitory working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 10, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1200) to perform methods in accordance with the disclosure. For example, some or all of the procedures of the described methods may be performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein, for example one or more steps of the method(s) described with respect to FIG. 10.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1225. Volatile media include, without limitation, dynamic memory, such as the working memory 1235. Transmission media include, without limitation, coaxial cables, copper wire and fiber optics, including the wires that comprise the bus 1205, as well as the various components of the communications subsystem 1230 (and/or the media by which the communications subsystem 1230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200. These signals, which might be in the form of electromagnetic signals, acoustic signals, optical signals and/or the like, are all examples of carrier waves on which instructions can be encoded, in accordance with various embodiments of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method, comprising:
   obtaining information indicative of a micro-PoR visited by a mobile device at a first time, the information being based on measurements from the mobile device at the first time; and
   deriving an attribute of the visit based on the information and a place model associating micro-PoRs with macro-PoRs.

2. The method of claim 1, further comprising:
   obtaining information indicative of a first macro-PoR visited by the mobile device during the first time, the information indicative of the first macro-PoR being based on measurements from the mobile device at the first time; and
   correcting the first macro-PoR using the derived attribute.

3. The method of claim 2, wherein the derived attribute comprises a length of time spent at the first macro-PoR.

4. The method of claim 2, wherein the derived attribute comprises a second macro-PoR, the second macro-PoR being associated with the micro-PoR in the place model.

5. The method of claim 4, further comprising:
   determining, prior to the correcting, that a confidence level determined with respect to the association of the micro-PoR with the second macro-PoR in the place model is above a threshold.

6. The method of claim 4, wherein the confidence level is determined based on a number of times that a relationship between the micro-PoR and the second macro-PoR has been observed.

7. The method of claim 1, further comprising:
   obtaining a macro-PoR visited by the mobile device during the first time,
   wherein the attribute comprises a length of time spent at the micro-PoR, and
   wherein the length of time is derived based on the macro-PoR.

8. The method of claim 1,
   wherein the derived attribute comprises a macro-PoR, the macro-PoR being associated with the micro-PoR in the place model, and
   wherein the method further includes merging the visit with a second visit to the macro-PoR.

9. The method of claim 1,
   wherein the micro-PoR is not associated with a macro-PoR in the place model,
   wherein the derived attribute comprises a first macro-PoR visited by the mobile device during the first time, and
   wherein deriving the attribute of the visit includes determining that the micro-PoR is located in the same macro-PoR as a second micro-PoR, based on information in the place model that associates the second micro-PoR with the first macro-PoR.

10. The method of claim 1, wherein the information indicative of the micro-PoR includes a label associated with the micro-PoR.

11. The method of claim 1, wherein obtaining information indicative of a micro-PoR visited by a mobile device at a first time includes clustering measurements obtained at different physical points associated with the micro-PoR.

12. The method of claim 1, wherein the measurements include at least one WiFi fingerprint.

13. The method of claim 1, further comprising:
   providing one or more location-based functionalities based at least in part on the derived attribute, or changing one or more behaviors of the mobile device based at least in part on the derived attribute.

14. A mobile device, comprising:
   an information obtaining subsystem configured to obtain information indicative of a micro-PoR visited by a mobile device at a first time, the information being based on measurements from the mobile device at the first time; and
   an attribute deriving subsystem configured to derive an attribute of the visit based on the information and a place model associating micro-PoRs with macro-PaRs.

15. The mobile device of claim 14,
   wherein the information obtaining subsystem is configured to obtain information indicative of a first macro-PoR visited by the mobile device during the first time, the information indicative of the first macro-PoR being based on measurements from the mobile device at the first time; and
   wherein the attribute deriving subsystem is configured to correct the first macro-PoR using the derived attribute.

16. The mobile device of claim 15, wherein the derived attribute comprises a length of time spent at the first macro-PoR.

17. The mobile device of claim 15, wherein the derived attribute comprises a second macro-PoR, the second macro-PoR being associated with the micro-PoR in the place model.

18. The mobile device of claim 17,
   wherein the attribute deriving subsystem is configured to determine, prior to the correcting, that a confidence level determined with respect to the association of the micro-PoR with the second macro-PoR in the place model is above a threshold.

19. The mobile device of claim 17, wherein the confidence level is determined based on a number of times that a relationship between the micro-PoR and the second macro-PoR has been observed.

20. The mobile device of claim 14,
   wherein the information obtaining subsystem is configured to obtain a macro-PoR visited by the mobile device during the first time,
   wherein the attribute comprises a length of time spent at the micro-PoR, and
   wherein the length of time is derived based on the macro-PoR.

21. The mobile device of claim 14,
   wherein the derived attribute comprises a macro-PoR, the macro-PoR being associated with the micro-PoR in the place model, and
   wherein the attribute deriving subsystem is configured to merge the visit with a second visit to the macro-PoR.

22. The mobile device of claim 14,
   wherein the micro-PoR is not associated with a macro-PoR in the place model,
   wherein the derived attribute comprises a first macro-PoR visited by the mobile device during the first time, and
   wherein the attribute deriving subsystem is configured to derive the attribute of the visit at least in part by determining that the micro-PoR is located in the same macro-PoR as a second micro-PoR, based on information in the place model that associates the second micro-PoR with the first macro-PoR.

23. The mobile device of claim 14, wherein the information indicative of the micro-PoR includes a label associated with the micro-PoR.

24. The mobile device of claim 14, wherein the information obtaining subsystem is configured to cluster measurements obtained at different physical points associated with the micro-PoR.

25. The mobile device of claim 14, wherein the measurements include at least one WiFi fingerprint.

26. The mobile device of claim 14, comprising:
a processor configured to provide one or more location-based functionalities based at least in part on the derived attribute, or a processor configured to change one or more behaviors of the mobile device based at least in part on the derived attribute.

27. One or more non-transitory computer-readable media storing computer-executable instructions that, when executed, cause at least one processor to:
obtain information indicative of a micro-PoR visited by a mobile device at a first time, the information being based on measurements from the mobile device at the first time; and
derive an attribute of the visit based on the information and a place model associating micro-PoRs with macro-PoRs.

28. A computing device comprising:
means for obtaining, by the computing device, information indicative of a micro-PoR visited by a the computing device at a first time, the information being based on measurements from the mobile device at the first time; and
means for deriving, by the computing device, an attribute of the visit based on the information and a place model associating micro-PoRs with macro-PoRs.

29. The computing device of claim 28, further comprising:
means for obtaining information, by the computing device, indicative of a first macro-PoR visited by the computing device during the first time, the information indicative of the first macro-PoR being based on measurements from the mobile device at the first time; and
means for correcting, by the computing device, the first macro-PoR using the derived attribute.

30. The computing device of claim 29, wherein the derived attribute, by the computing device, comprises a length of time spent at the first macro-PoR.

31. The computing device of claim 29, wherein the derived attribute, by the computing device, comprises a second macro-PoR, the second macro-PoR being associated with the micro-PoR in the place model.

32. The computing device of claim 31, further comprising:
means for determining, by the computing device, that a confidence level determined with respect to the association of the micro-PoR with the second macro-PoR in the place model is above a threshold, prior to correcting the first macro-PoR using the derived attribute.

33. The computing device of claim 31, wherein the confidence level is determined based on a number of times that a relationship between the micro-PoR and the second macro-PoR has been observed.

34. The computing device of claim 28, further comprising:
means for obtaining, by the computing device, a macro-PoR visited by the computing device during the first time,
wherein the attribute comprises a length of time spent at the micro-PoR, and
wherein the length of time is derived based on the macro-PoR.

35. The computing device of claim 28,
wherein the derived attribute comprises a macro-PoR, the macro-PoR being associated with the micro-PoR in the place model, and
wherein the computing device further comprises means for merging the visit with a second visit to the macro-PoR.

36. The computing device of claim 28,
wherein the micro-PoR is not associated with a macro-PoR in the place model
wherein the derived attribute comprises a first macro-PoR visited by the computing device during the first time, and
wherein the means for deriving the attribute of the visit includes means for determining that the micro-PoR is located in the same macro-PoR as a second micro-PoR, based on information in the place model that associates the second micro-PoR with the first macro-PoR.

37. The computing device of claim 28, wherein the information indicative of the micro-PoR includes a label associated with the micro-PoR.

38. The computing device of claim 28, wherein the means for obtaining information indicative of a micro-PoR visited by the computing device at a first time includes means for clustering measurements obtained at different physical points associated with the micro-PoR.

39. The computing device of claim 28, wherein the measurements, by the computing device, include at least one WiFi fingerprint.

40. The computing device of claim 28, further comprising:
means for providing, by the computing device, one or more location-based functionalities based at least in part on the derived attribute, or means for changing one or more behaviors of the computing device based at least in part on the derived attribute.

* * * * *